(12) United States Patent
Kim et al.

(10) Patent No.: US 8,948,066 B2
(45) Date of Patent: Feb. 3, 2015

(54) METHOD FOR PERFORMING A HARQ PROCESS AND APPARATUS USING SAME

(75) Inventors: Hakseong Kim, Anyang-si (KR); Hanbyul Seo, Anyang-si (KR); Byounghoon Kim, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 75 days.

(21) Appl. No.: 13/702,959

(22) PCT Filed: Jun. 9, 2011

(86) PCT No.: PCT/KR2011/004244
§ 371 (c)(1),
(2), (4) Date: Dec. 7, 2012

(87) PCT Pub. No.: WO2011/155785
PCT Pub. Date: Dec. 15, 2011

(65) Prior Publication Data
US 2013/0077543 A1  Mar. 28, 2013

Related U.S. Application Data

(60) Provisional application No. 61/353,209, filed on Jun. 9, 2010, provisional application No. 61/373,267, filed on Aug. 12, 2010, provisional application No. 61/377,102, filed on Aug. 26, 2010, provisional
(Continued)

(30) Foreign Application Priority Data

Jun. 9, 2011 (KR) .................. 10-2011-0055687

(51) Int. Cl.
*H04J 1/00* (2006.01)
*H04W 4/00* (2009.01)
(Continued)

(52) U.S. Cl.
CPC ......... *H04W 72/005* (2013.01); *H04B 7/15507* (2013.01); *H04L 1/1861* (2013.01); *H04W 72/042* (2013.01); *H04L 1/1812* (2013.01); *H04L 2001/0097* (2013.01)
USPC .......................................... 370/281; 370/329

(58) Field of Classification Search
USPC ........................... 370/280–281, 329, 336, 343
See application file for complete search history.

(56) References Cited

U.S. PATENT DOCUMENTS

| 2010/0080166 A1* | 4/2010 | Palanki et al. ................. 370/315 |
| 2010/0131813 A1 | 5/2010 | Kim et al. |
| 2011/0096717 A1 | 4/2011 | Kim et al. |

FOREIGN PATENT DOCUMENTS

| KR | 10-2009-0128323 A | 12/2009 |
| KR | 10-2010-0040645 A | 4/2010 |
| KR | 10-2010-0058060 A | 6/2010 |

*Primary Examiner* — Afshawn Towfighi
(74) *Attorney, Agent, or Firm* — Birch, Stewart, Kolasch & Birch, LLP

(57) ABSTRACT

The present description relates to a method for performing a HARQ process operation in a wireless communication system and to an apparatus using the method. A base station device which performs a HARQ process operation comprises a transmitter which transmits to a relay an uplink (UL) grant in a downlink backhaul subframe n which is a subframe having an index n among the allocated downlink backhaul subframes, and transmits, if downlink data sent from the relay in accordance with the uplink grant is not successfully received, a non-acknowledgement (NACK) signal in a downlink backhaul subframe n+N which is a downlink backhaul subframe that comes after N which is a predetermined number of HARQ processes counted from the downlink backhaul subframe n among the allocated downlink backhaul subframes.

20 Claims, 13 Drawing Sheets

Related U.S. Application Data application No. 61/381,062, filed on Sep. 8, 2010, provisional application No. 61/381,421, filed on Sep. 9, 2010, provisional application No. 61/390,587, filed on Oct. 6, 2010, provisional application No. 61/392,027, filed on Oct. 11, 2010, provisional application No. 61/392,934, filed on Oct. 13, 2010, provisional application No. 61/411,445, filed on Nov. 8, 2010.

(51) Int. Cl.

| | |
|---|---|
| *H04W 72/00* | (2009.01) |
| *H04B 7/155* | (2006.01) |
| *H04L 1/18* | (2006.01) |
| *H04W 72/04* | (2009.01) |
| *H04L 1/00* | (2006.01) |

(a)

(b)

METHOD FOR PERFORMING A HARQ PROCESS AND APPARATUS USING SAME

CROSS REFERENCE TO RELATED APPLICATIONS

This non-provisional application is a National Stage entry under U.S.C. §371 of International Application No. PCT/KR2011/004244 filed on Jun. 9, 2011, which claims the benefit of U.S. Provisional Application Nos. 61/353,209 filed on Jun. 9, 2010, 61/373,267 filed on Aug. 12, 2010, 61/377,102 filed on Aug. 26, 2010, 61/381,062 filed on Sep. 8, 2010, 61/381,421 filed on Sep. 9, 2010, 61/390,587 filed on Oct. 6, 2010, 61/392,027 filed on Oct. 11, 2010, 61/392,934 filed on Oct. 13, 2010, 61/411,445 filed on Nov. 8, 2010, and to Korean Patent Application No. 10-2011-0055687 filed in Republic of Korea, on Jun. 9, 2011. The entire contents of all of the above applications are hereby incorporated by reference.

TECHNICAL FIELD

The present invention relates to wireless communication and more specifically, to a method for performing a HARQ process and an apparatus using the same.

BACKGROUND ART

In wireless communication systems, it is difficult to transmit data since various types of errors are generated due to propagation of transmitted signals in a wireless manner. In addition to thermal noise represented as additive white Gaussian noise (AWGN), path loss that increases with increasing distance from an eNode B (eNB), multi-path fading, etc. generated in radio channels make reliable signal transmission difficult.

To secure transmission reliability against generation of various channel state variations and errors in wireless communication, technologies such as 1) forward error correction (FEC) or channel coding and 2) automatic repeat request (ARQ) or hybrid automatic repeat request (HARQ) are widely used.

In a next-generation 3GPP LTE-A communication system, two types of links having different attributes are respectively applied to uplink and downlink carrier frequency bands as a relay forwards link connection between en eNB and a user equipment (UE). Connection link established between the eNB and the relay is defined as a backhaul link. The relay can receive information from the eNB through a relay backhaul downlink and transmit information to the eNB through a relay backhaul uplink. Furthermore, the relay can transmit information to the UE through a relay access downlink and receive information from the UE through a relay access uplink.

For the 3GPP LTE-A system to which the relay has been introduced, there is not provided a HARQ process performed between the relay and the eNB and between the eNB and the UE, for example, a method of determining the number of HARQ processes, information about a subframe to which a HARQ process is applied, etc. Accordingly, a HARQ process taking introduction of a relay into account is needed.

DISCLOSURE

Technical Problem

An object of the present invention is to provide a method for performing a HARQ process by an eNB.

Another object of the present invention is to provide a method for performing a HARQ process by a relay.

Another object of the present invention is to provide an eNB that performs a HARQ process.

Another object of the present invention is to provide a relay that performs a HARQ process.

The technical problems solved by the present invention are not limited to the above technical problems and those skilled in the art may understand other technical problems from the following description.

Technical Solution

According to one aspect of the present invention, a method for performing a HARQ process operation by an eNB in a wireless communication system includes: transmitting, to a relay node, an uplink (UL) grant in a downlink backhaul subframe n which is a subframe having an index n among allocated downlink backhaul subframes; and transmitting, if uplink data sent from the relay node in accordance with the uplink grant is not successfully received, a negative-acknowledgement (NACK) signal in a downlink backhaul subframe n+N which is a downlink backhaul subframe that comes after N which is a predetermined number of HARQ processes from the downlink backhaul subframe n among the allocated downlink backhaul subframes. The predetermined number of HARQ processes, N, may be a value determined according to a predefined rule. The predefined rule may be excluding at least one of a downlink stand-alone subframe, an LTE-A dedicated subframe, a fake-multicast broadcast single frequency network (MBSFN) subframe, a non-MBSFN subframe, an almost blank subframe (ABS), a positioning RS subframe, a cell and a true MBSFN subframe from the allocated downlink backhaul subframes in calculation of the number of HARQ processes.

According another aspect of the present invention, a method for performing a HARQ process operation by a relay node in a wireless communication system includes: receiving downlink backhaul subframe allocation information from an eNB; transmitting, to the eNB, uplink data in a corresponding uplink backhaul subframe on the basis of the relationship between an uplink grant reception time and an uplink data transmission time, which are predetermined for an uplink grant received in a downlink backhaul subframe n; and, if the uplink data is not successfully transmitted, receiving, from the eNB, a NACK signal in a downlink backhaul subframe n+N which is a downlink backhaul subframe that comes after N which is a predetermined number of HARQ processes counted from the downlink backhaul subframe n among the allocated downlink backhaul subframes, on the basis of the predetermined number of HARQ processes. The method may further include retransmitting the uplink data after a predefined time interval between when the NACK signal is received and when the uplink data is retransmitted from the downlink backhaul subframe n+N. The predefined time interval may correspond to three subframes, and the uplink data may be retransmitted in an uplink backhaul subframe which comes after three subframes that follow the downlink backhaul subframe n+N. The downlink backhaul subframe allocation information may include information configured of backhaul subframes that can be used by the relay node. The method may further include receiving the NACK signal in the downlink backhaul subframe n+N which is a downlink backhaul subframe that comes after N which is a predetermined number of HARQ processes counted from the downlink backhaul subframe n among allocated downlink backhaul subframes other than fake-MBSFN subframes from among the backhaul subframes that can be used by the relay node. The downlink backhaul subframe allocation information may include the backhaul subframes that can be used by the relay, other than at least one of a downlink stand-alone subframe, an LTE-A dedicated subframe, a fake-MBSFN subframe, a non-MBSFN subframe, a positioning RS subframe, a cell and a true MBSFN subframe. The downlink backhaul subframe allocation information may be signaled in a bitmap pattern having a predetermine size. The downlink backhaul subframe allocation information may be received through a higher layer signaling. The method may further include receiving the information about the number of HARQ processes, N, and the downlink backhaul subframe allocation information and the information about the number of HARQ processes, N, may be received in the same time period. The method may further include receiving information about backhaul subframes that cannot be used as downlink backhaul subframes, wherein the NACK signal is received in the downlink backhaul subframe n+N which is a downlink backhaul subframe that conies after N which is a predetermined number of HARQ processes counted from the downlink backhaul subframe n among downlink backhaul subframes other than subframes that cannot be used as the downlink backhaul subframes in the downlink backhaul subframe allocation information.

According to another aspect of the present invention, an eNode B (eNB) apparatus for performing a HARQ process operation in a wireless communication system includes a transmitter configured to transmit, to a relay node, a UL grant in a downlink backhaul subframe n which is a subframe having an index n among allocated downlink backhaul subframes and to transmit, if uplink data sent from the relay in accordance with the uplink grant is not successfully received, a NACK signal in a downlink backhaul subframe n+N which is a downlink backhaul subframe that comes after N which is a predetermined number of HARQ processes from the downlink backhaul subframe n among the allocated downlink backhaul subframes.

According to another aspect of the present invention, a relay node apparatus for performing a HARQ process operation in a wireless communication system includes: a receiver configured to receive downlink backhaul subframe allocation information from an eNB; a transmitter configured to transmit, to the eNB, uplink data in a corresponding uplink backhaul subframe on the basis of the relationship between an uplink grant reception time and an uplink data transmission time, which are predetermined for an uplink grant received in a downlink backhaul subframe n; and a processor configured to control the receiver to receive, from the eNB, a NACK signal in a downlink backhaul subframe n+N which is a downlink backhaul subframe that comes after N which is a predetermined number of HARQ processes counted from the downlink backhaul subframe n among the allocated downlink backhaul subframes, on the basis of the predetermined number of HARQ processes, if the uplink data is not successfully transmitted.

Advantageous Effects

According to embodiment of the present invention, a HARQ process can be performed between a relay and an eNB, between the relay and a UE, and between the eNB and the UE, and thus communication performance can be improved through correct HARQ feedback.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a mobile communication system is a 3GPP LTE or LTE-A system. However, the description is applicable to any other mobile communication system except for specific features inherent to 3GPP LTE and LTE-A.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), an Advanced Mobile Station (AMS), a machine to machine (M2M) device, etc. In addition, the term Base Station (BS) generically refers to any node at a network end which communicates with a UE, such as a Node B, an evolved Node B (eNB), an Access Point (AP), etc.

In a mobile communication system, a UE can receive information from an eNB on downlink and transmit data to the eNB on uplink. Information transmitted from or received at the UE includes data and various types of control information. There are many physical channels depending on the types and usages of information transmitted from or received at UEs and eNBs.

Figure 1:
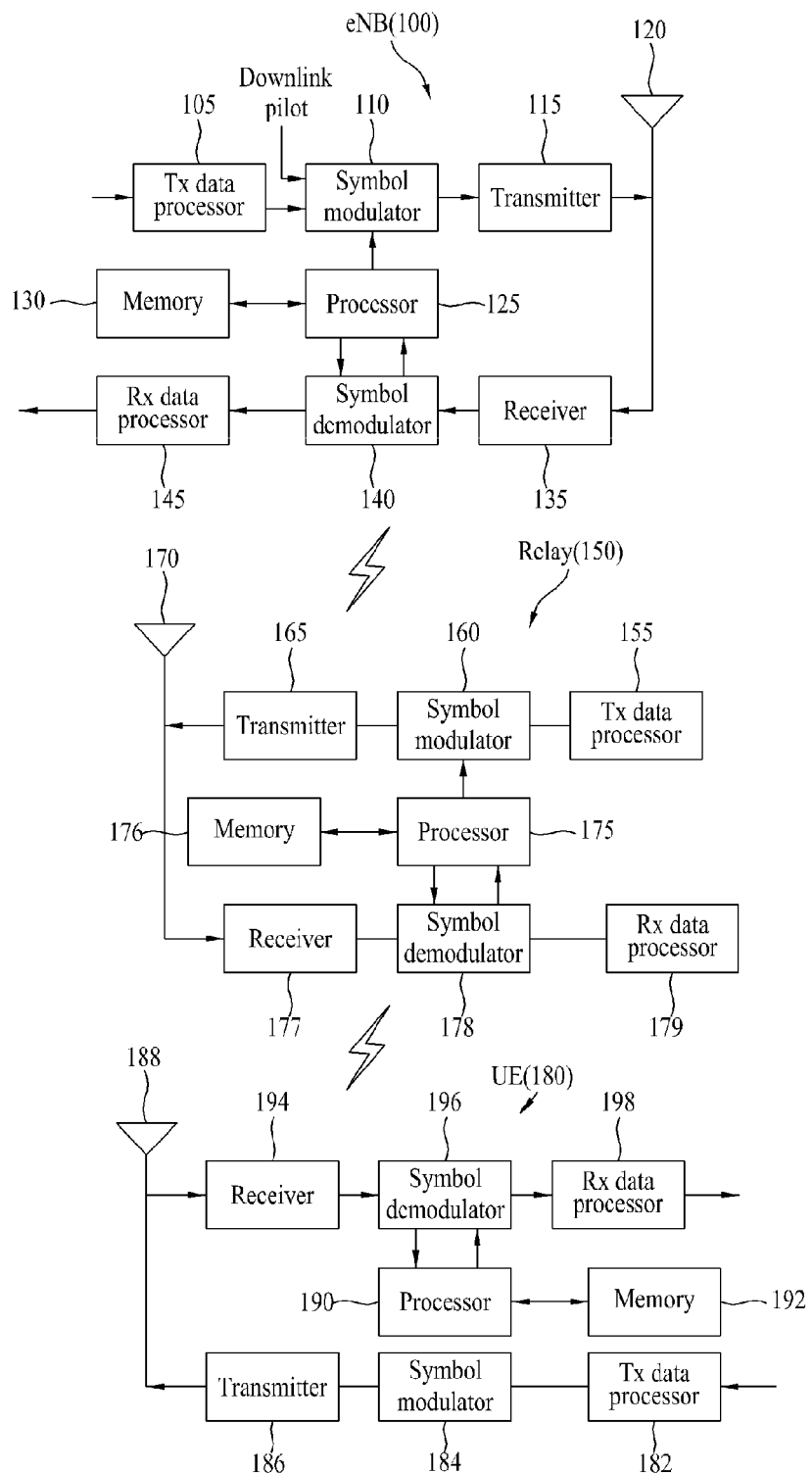
FIG. 1 is a block diagram of a communication system according to an embodiment of the present invention.

FIG. 1 is a block diagram of a communication system according to an embodiment of the present invention.

The communication system according to an embodiment of the invention may include an eNB 100, a relay 150, a UE 180, a network (not shown). While FIG. 1 shows one eNB 100, one relay 150 and one UE 180 for simplifying the configuration of the communication system, the communication system can include a plurality of eNBs, a plurality of relays and a plurality of UEs.

Referring to FIG. 1, the eNB 100 may include a transmission (Tx) data processor 105, a symbol modulator 110, a transmitter 115, a transceiving antenna 120, a processor 125, a memory 130, a receiver 135, a symbol demodulator 140, and a reception (Rx) data processor 145. The relay 150 may include a Tx data processor 155, a symbol modulator 160, a transmitter 165, a transceiving antenna 170, a processor 175, a memory 176, a receiver 177, a symbol demodulator 178, and a Rx data processor 179. The UE 180 may include a Tx data processor 182, a symbol modulator 184, a transmitter 186, a transceiving antenna 188, a processor 190, a memory 192, a receiver 194, a symbol demodulator 196, and a Rx data processor 198.

While FIG. 1 shows that the eNB 100, the relay 150 and the UE 180 respectively include the antennas 120, 170 and 188, each of the eNB 100, the relay 150 and the UE 180 includes a plurality of antennas. Accordingly, the eNB 100, the relay 150 and the UE 180 support a Multiple Input Multiple Output (MIMO) system. The eNB 100, the relay 150 and the UE 180 according to an embodiment of the present invention can support both single user-MIMO (SU-MIMO) and multi-user-MIMO (MU-MIMO).

In downlink, the Tx data processor 105 of the eNB 100 receives traffic data, formats and codes the received traffic data, and interleaves and modulates (or symbol-maps) the coded traffic data to generate modulation symbols ("data symbols"). The symbol modulator 110 receives and processes the data symbols and pilot symbols to generate symbol streams. The symbol modulator 110 of the eNB 100 multiplexes the data symbols and the pilot symbols and transmits the multiplexed symbols to the transmitter 115. Here, the transmitted symbols may be data symbols, pilot symbols, or null signal values. The pilot symbols may be contiguously transmitted in respective symbol periods. The pilot symbols may be frequency division multiplexing (FDM), orthogonal frequency division multiplexing (OFDM), time division multiplexing (TDM) or code division multiplexing (CDM) symbols. The transmitter 115 of the eNB 100 receives the symbol streams, converts the received symbol streams into one or more analog signals and additionally processes (e.g. amplifies, filters and frequency-upconverts) the analog signals to generate a downlink signal suitable for transmission through a radio channel. The downlink signal is transmitted to the relay 150 and/or the UE 180 through the antenna 120.

The receive antenna 170 of the relay 150 receives the downlink signal from the eNB 100 or receives an uplink signal from the UE 180 and provides the received signal to the receiver 177. The receiver 177 processes (e.g. filters, amplifiers and frequency-downconverts) the received signal and digitalizes the processed signal to acquire samples. The symbol demodulator 178 demodulates the received pilot symbols and provides the demodulated pilot symbols to the processor 175 for channel estimation.

The processor 175 of the relay 150 may demodulate and process the downlink/uplink signal received from the eNB 100 and/or the UE 180 and transmit the processed signal to the UE 180 and/or eNB 100 through the transmit antenna 170.

In the UE 180, the antenna 188 receives a downlink signal from the eNB 100 and/or the relay 150 and provides the received signal to the receiver 194. The receiver 194 processes (e.g. filters, amplifies and frequency-downconverts) the received signal and digitalizes the processed signal to acquire samples. The symbol demodulator 198 demodulates received pilot symbols and provides the pilot symbols to the processor 190 for channel estimation.

The symbol demodulator 196 receives a frequency response estimation value for downlink from the processor 190 and demodulates received data symbols to obtain data symbol estimation values (estimation values of transmitted data symbols) and provides the data symbol estimation values to the Rx data processor 198. The Rx data processor 150 demodulates the data symbol estimation values (i.e., performs symbol demapping), deinterleaves and decodes the demodulated data symbol estimation values to restore transmitted traffic data.

Processing by the symbol demodulator 196 and the Rx data processor 198 is complementary to processing by the symbol modulator 110 and Tx data processor 105 of the eNB 100.

The Tx data processor 182 of the UE 180 processes traffic data to provide data symbols on uplink. The symbol modulator 184 receives the data symbols and multiplexes the data symbols with pilot symbols, modulates the multiplexed data symbols and pilot symbols to provide symbol streams to the transmitter 186. The transmitter 186 receives and processes the symbol streams to generate an uplink signal. The uplink signal is transmitted to the eNB 110 or the relay 150 through the antenna 135.

The eNB 100 receives an uplink signal from the UE 180 and/or the relay 150 through the antenna 130. The receiver 190 processes the received uplink signal to acquire samples. The symbol demodulator 195 processes the samples to provide pilot symbols and data symbol estimation values received for uplink. The Rx data processor 197 processes the data symbol estimation values to restore traffic data transmitted from the UE 180 and/or the relay 150.

The processors 125, 175 and 190 of the eNB 100, the relay 150 and the UE 180 respectively direct (e.g. control, adjust, manage, etc.) operations of the eNB 100, the relay 150 and the UE 180. The processors 125, 175 and 190 may be respectively connected to the memories 130, 176 and 192 that store program codes and data. The memories 130, 176 and 192 are respectively connected to the processors 125, 175 and 190 and store operating systems, applications and general files.

The processors 125, 175 and 190 may be referred to as controllers, microcontrollers, microprocessors, microcomputers, etc. The processors 125, 175 and 190 may be implemented by hardware, firmware, software or a combination thereof.

When the embodiments of the present invention are implemented using firmware or software, the firmware or software may be configured such that modules, procedures or functions that perform functions or operations of the present invention are included in the firmware or software. The firmware or software configured to implement the present invention may be included in the processors 125, 175 and 190 or stored in the memories 130, 176 and 192 and executed by the processors 125, 175 and 190.

Radio interface protocol layers between the eNB 100, the relay 150 and the UE 180 and a wireless communication system (network) may be classified into first layer L1, second layer L2 and third layer L3 on the basis of lower 3 layers of the open system interconnection (OSI) model well-known in communication systems. A physical layer belongs to first layer L1 and provides an information transmission service through a physical channel. A radio resource control (RRC) layer belongs to third layer L3 and provides control radio resources between the UE 180 and the network. The eNB 100, the relay 150 and the UE 180 exchange RRC messages through the wireless communication network and the RRC layer.

Figure 2:
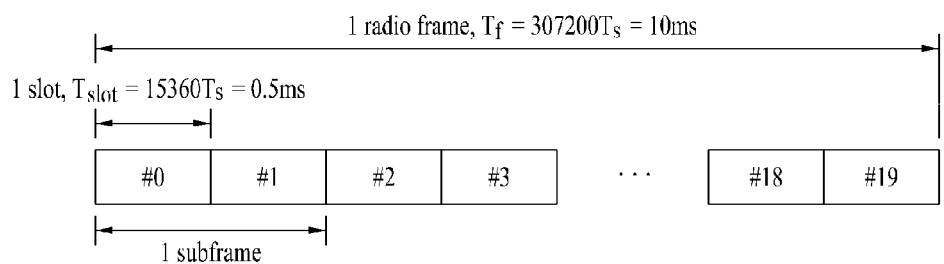
FIG. 2 illustrates an exemplary radio frame structure used in a 3GPP LTE system corresponding to a mobile communication system.

FIG. 2 illustrates an exemplary radio frame structure used in a 3GPP LTE system corresponding to a mobile communication system.

Referring to FIG. 2, one radio frame has a length of 10 ms (327200 Ts) and includes ten subframes having an equal size. Each subframe has a length of 1 ms and includes two slots each having a length of 0.5 ms (15360 Ts). Here, Ts denotes a sampling time, which is represented as Tx=1/(15 kHz× 2048)=3.2552×10$^{-8}$ (approximately 33 ns). A slot includes a plurality of Orthogonal Frequency Division Multiplexing (OFDM) symbols or Single Carrier-Frequency Division Multiple Access (SC-FDMA) symbols in the time domain and a plurality of resource blocks in the frequency domain.

In the LTE system, one resource block includes 12 subcarriers×7(6) OFDM symbols or SC-FDMA symbols. A unit time for transmitting data, Transmission Time Interval (TTI), may be set to one or more subframes. The above-described radio frame structure is exemplary and the number of subframes included in the radio frame, the number of slots included in one subframe, and the number of OFDM symbols or SC-FDMA symbols included in each slot may be changed in various manners.

Figure 3:
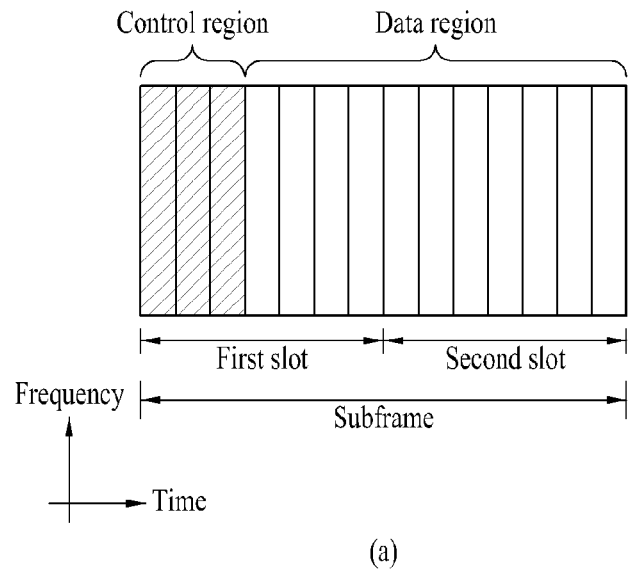
FIGS. 3a and 3b respectively illustrate downlink and uplink subframe structures used in a 3GPP LTE mobile communication system.
Figure 3:
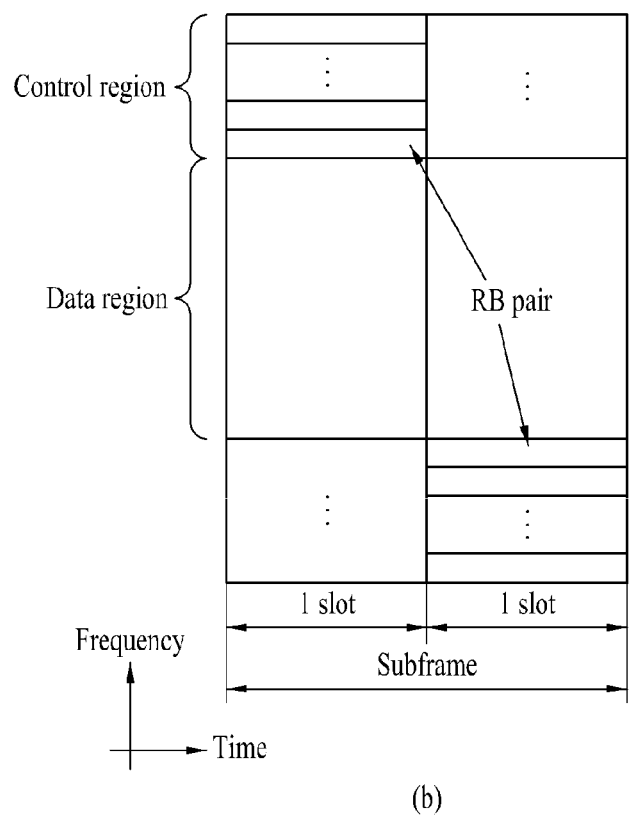

FIGS. 3a and 3b respectively illustrate downlink and uplink subframe structures used in a 3GPP LTE system corresponding to a mobile communication system.

Referring to FIG. 3(a), one downlink subframe includes two slots in the time domain. A maximum of three OFDM symbols located in a front portion of a first slot in the downlink subframe correspond to a control region allocated with control channels, and the remaining OFDM symbols correspond to a data region allocated with a Physical Downlink Shared CHannel (PDSCH).

Examples of downlink control channels used in the 3GPP LTE include a Physical Control Format Indicator CHannel (PCFICH), a Physical Downlink Control CHannel (PDCCH), a Physical Hybrid-ARQ Indicator CHannel (PHICH), etc. The PCFICH is transmitted at a first OFDM symbol of a subframe and carries information regarding the number of OFDM symbols (i.e., a control region size) used for transmission of control channels within the subframe. Control information transmitted over the PDCCH is referred to as downlink control information (DCI). The DCI includes uplink resource allocation information, downlink resource allocation information, and an uplink transmit power control command for arbitrary user equipment (UE) groups. The PHICH carries an acknowledgement/not-acknowledgement(ACK/NACK) signal with respect to uplink Hybrid Automatic Repeat Request (HARQ). That is, an ACK/NACK signal with respect to uplink data sent from a UE is transmitted over the PHICH.

A description will be given of a PDCCH corresponding to a downlink physical channel.

The PDCCH can carry a resource allocation and transmission format of a PDSCH (which may be referred to as a DL grant), resource allocation information of a PUSCH (which may be referred to as a UL grant), a set of transmit power control commands on individual UEs within an arbitrary UE group, activation of a Voice over Internet Protocol (VoIP), etc. A plurality of PDCCHs can be transmitted within a control region. A UE can monitor the PDCCHs. The PDCCH includes an aggregate of one or several consecutive Control Channel Elements (CCEs). The PDCCH can be transmitted in the control region after subblock interleaving. A CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information carried on the PDCCH is called DCI. Table 1 shows DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 conveys uplink resource allocation information, DCI format 1 to DCI format 2 are used to indicate downlink resource allocation information, and DCI format 3 and DCI format 3A indicate uplink transmit power control (TPC) command for UE groups.

A method of mapping resources by an eNB for PDCCH transmission in an LTE system is described briefly.

In general, the eNB can transmit scheduling allocation information and other control information through a PDCCH. A physical control channel may be transmitted through an aggregation of one or more contiguous CCEs. A CCE includes 9 resource element groups (REGs). The number of REGs which are not allocated to a PCFICH or PHICH is represented by NREG. CCEs that can be used in the system correspond to 0 to NCCE-1 (here, $N_{CCE}=\lfloor N_{REG}/9 \rfloor$). A PDCCH supports multiple formats as shown in the following table 2. A PDCCH composed of n contiguous CCEs starts from a CCE that performs i mod n=0 (here, i is a CCE number). Multiple PDCCHs may be transmitted through one subframe.

TABLE 2

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the eNB can determine a PDCCH format on the basis of the number of regions in which the eNB will transmit control information. A UE can reduce overhead by reading the control information on a CCE basis. Similarly, a relay (or relay node) can read the control information on an relay-CCE (R-CCE) basis. In the LTE-A system, resource elements (REs) can be mapped on an R-CCE basis in order to transmit an R-PDCCH for an arbitrary relay. A description will be given of a method for mapping resources to REs when the eNB dynamically allocates resources in order to transmit R-PDCCHs.

Referring to FIG. 3b, an uplink subframe can be divided in the frequency domain into a control region and a data region. The control region is allocated with a PUCCH for carrying uplink control information. The data region is allocated with a PUSCH for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. The RB pair allocated to the PUCCH is frequency-hopped in a slot boundary.

Figure 4:
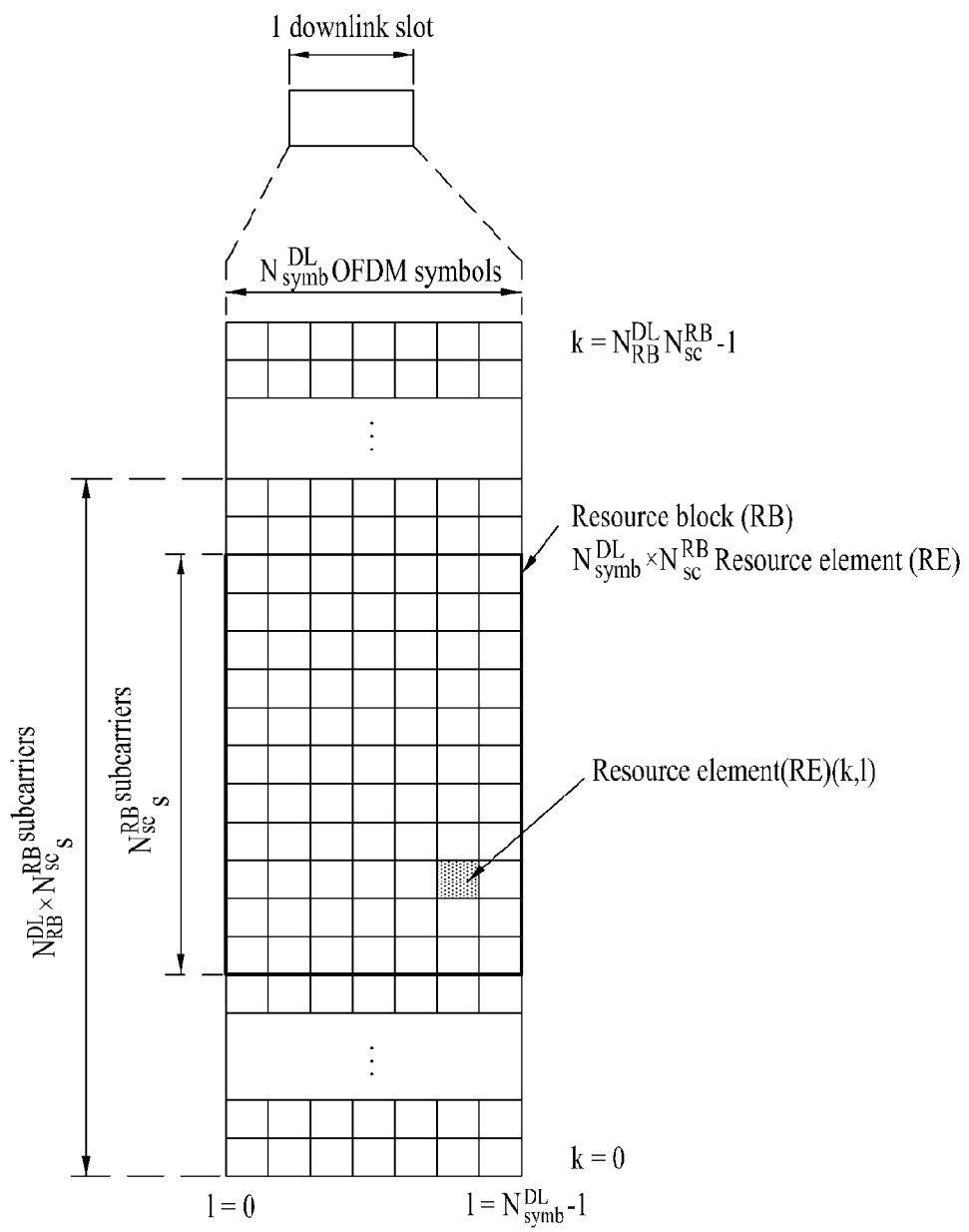
FIG. 4 illustrates a time-frequency resource grid structure of downlink used in the present invention.

FIG. 4 shows a downlink time-frequency resource grid structure used in the present invention.

A downlink signal transmitted in each slot may be described by a resource grid including $N_{RB}^{DL} \times N_{SC}^{RB}$ subcarriers and $N_{symb}^{DL}$ OFDM symbols. $N_{RB}^{DL}$ indicates the number of downlink resource blocks (RBs), $N_{SC}^{RB}$ represents the number of subcarriers which configure one RB, and $N_{symb}^{DL}$ indicates the number of OFDM symbols in one downlink slot. $N_{RB}^{DL}$ depends on a downlink transmission bandwidth set in a corresponding cell and needs to satisfy $N_{RB}^{min,DL} \leq N_{RB}^{DL} \leq N_{RB}^{max,DL}$. Here, $N_{RB}^{min,DL}$ indicates a minimum downlink bandwidth supported by a wireless communication system, and $N_{RB}^{max,RB}$ represents a maximum downlink bandwidth supported by the wireless communication system. While $N_{RB}^{min,DL}$ may be 6 and $N_{RB}^{max,RB}$ may be 110, they are not limited thereto. The number of OFDM symbols included in one slot may depend on the length of Cyclic Prefix (CP) and a subcarrier interval. In case of multi-antenna transmission, one resource grid can be defined per antenna port.

An element in the resource grid for each antenna port is called a Resource Element (RE) and uniquely identified by an index pair (k, l) in a slot. Here, k indicates a frequency-domain index ranging from 0 to $N_{RB}^{DL}N_{SC}^{RB}-1$, and l indicates a time-domain index ranging from 0 to $N_{symb}^{DL}-1$.

A RB shown in FIG. 4 is used to describe the mapping relationship between a physical channel and REs. RBs may be classified into a physical RB (PRB) and a virtual RB (VRB). One PRB is defined as $N_{symb}^{DL}$ consecutive OFDM symbols in the time domain and $N_{SC}^{RB}$ consecutive subcarriers in the frequency domain. Here, $N_{symb}^{DL}$ and $N_{SC}^{RB}$ may be predetermined values. For example, $N_{symb}^{DL}$ and $N_{SC}^{RB}$ may have values as shown in the following Table 3. Accordingly, one PRB includes $N_{symb}^{DL} \times N_{SC}^{RB}$ REs. While one PRB can correspond to one slot in the time domain and correspond to 180 kHz in the frequency domain, it is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

One PRB has a value in the range of 0 to $N_{RB}^{DL}-1$ in the frequency domain. The relationship between a PRB number $n_{PRB}$ in the frequency domain and a resource element (k, l) in one slot satisfies $$n_{PRB} = \left\lfloor \frac{k}{N_{sc}^{RB}} \right\rfloor.$$

The VRB has a size equal to the PRB. The VRB can be classified into a localized VRB (LVRB) and a distributed VRB (DVRB). For each VRB type, a pair of VRBs in two slots of one subframe are allocated with a single VRB number $n_{VRB}$.

The VRB may have a size equal to the PRB. For each of the LVRB and DVRB, a pair of VRB having a single VRB index (which may be referred to as a VRB number) are allocated to two slots in one subframe. In other words, $N_{RB}^{DL}$ VRBs which belong to the first one of two slots in one subframe are allocated with one of indexes in the range of 0 to $N_{RB}^{DL}-1$, and $N_{RB}^{DL}$ VRBs which belong to the second slot are also allocated with one of the indexes in the range of 0 to $N_{RB}^{DL}-1$.

A description will be given of a general multiple input multiple output (MIMO) scheme. MIMO can improve transmission/reception data efficiency using multiple transmit antennas and multiple receive antennas. That is, MIMI uses multiple antennas at a transmitter or receiver of a wireless communication system to improve capacity or performance. MIMO is referred to as "multi-antenna" hereinafter.

A multi-antenna technology collects data pieces received through multiple antennas and combines the received data pieces to accomplish a whole message without depending on a single antenna path. Accordingly, it is possible to increase a data transmission rate in a specific range or improve a system range for a specific data transmission rate.

Since next-generation mobile communication requires a data transmission rate much higher than that of conventional mobile communication, it is expected that an efficient multi-antenna technology is needed. MIMO attracts people's attention as a next-generation mobile communication technology which can be widely used for mobile communication terminals and relays and can overcome transmission capacity limit of mobile communication due to extension of data communication.

Among various technologies for improving transmission efficiency under development, MIMO using multiple antennas at a transmitter and a receiver can remarkably improve communication capacity and transmission/reception performance without allocating an additional frequency or increasing power.

Figure 5:
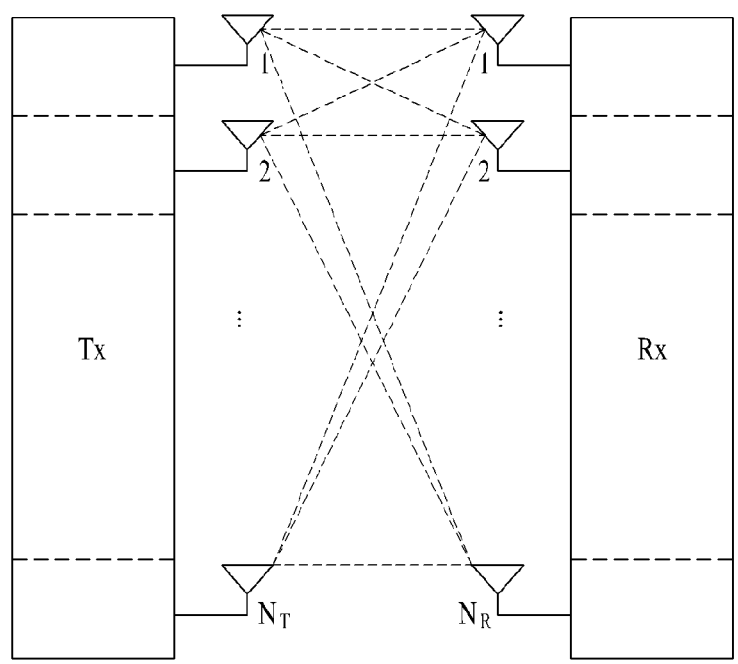
FIG. 5 illustrates a configuration of a general MIMO communication system.

FIG. 5 shows the configuration of a general MIMO communication system.

As shown in FIG. 5, when the number of transmit antennas and the number of receive antennas are increased to $N_T$ and $N_R$ respectively, a channel transmission capacity increases in proportion to the number of antennas in theory, distinguished from a case in which only transmitter or receiver uses multiple antennas. Accordingly, a transmission rate and frequency efficiency can be improved. The transmission rate can be increased by the product of a maximum transmission rate $R_0$ when a single antenna is used and a rate of increase $R_i$ represented by Equation 1 according to increase in the channel transmission capacity theoretically.

$$R_i = \min(N_T, N_R) \quad \text{[Equation 1]}$$

A communication scheme in the MIMO system will be described below using a mathematical model.

It is assumed that there are $N_T$ transmit antennas and $N_R$ receive antennas in the MIMO system, as shown in FIG. 5.

Regarding a transmission signal, up to $N_T$ pieces of information can be transmitted through the $N_T$ transmit antennas, as expressed as the following vector.

$$s = [s_1, s_2, \ldots, s_{N_T}]^T \quad \text{[Equation 2]}$$

A different transmit power may be applied to each piece of transmission information $s_1, s_2, \ldots, s_{N_T}$. Let the transmit power levels of the transmission information be denoted by $P_1, P_2, \ldots, P_{N_T}$, respectively. Then the transmit power-controlled transmission information $\hat{s}$ may be given as [Equation 3].

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

$\hat{s}$ may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Let's consider a case in which actual $N_T$ transmitted signals $x_1, x_2, \ldots, x_{N_T}$ are configured by applying a weight matrix W to the transmit power-controlled information vector $\hat{s}$. The weight matrix W functions to appropriately distribute the transmission information to the antennas according to transmission channel statuses, etc. These transmitted signals $x_1, x_2, \ldots, x_{N_T}$ are represented as a vector X, which may be determined as $$X = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

In Equation 5, $w_{ij}$ denotes a weight for a $j^{th}$ piece of information $\hat{s}_j$ transmitted through an $i^{th}$ transmit antenna. W is also referred to as a weight matrix or a precoding matrix.

The transmitted signals X may be considered in a case using spatial diversity and a case using spatial multiplexing.

Elements of the information vector s have different values since different signals are multiplexed and transmitted in the case using spatial multiplexing, whereas all the elements of the information vector s have the same value since the same signal is transmitted through multiple channel paths when spatial diversity is used.

A method of combining spatial multiplexing and spatial diversity may also be considered. For example, the same signal can be transmitted through three transmit antennas using spatial diversity and other signals can be spatially multiplexed and transmitted. Given $N_R$ receive antennas, signals received at the receive antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of the transmit antennas and receive antennas. A channel between a $j^{th}$ transmit antenna and an $i^{th}$ receive antenna is represented as $h_{ij}$. It is to be noted herein that the index of the receive antenna precedes that of the transmit antenna in $h_{ij}$. A plurality of channels may be combined and represented by a vector and matrix. An example of vector representation will now be described.

Figure 6:
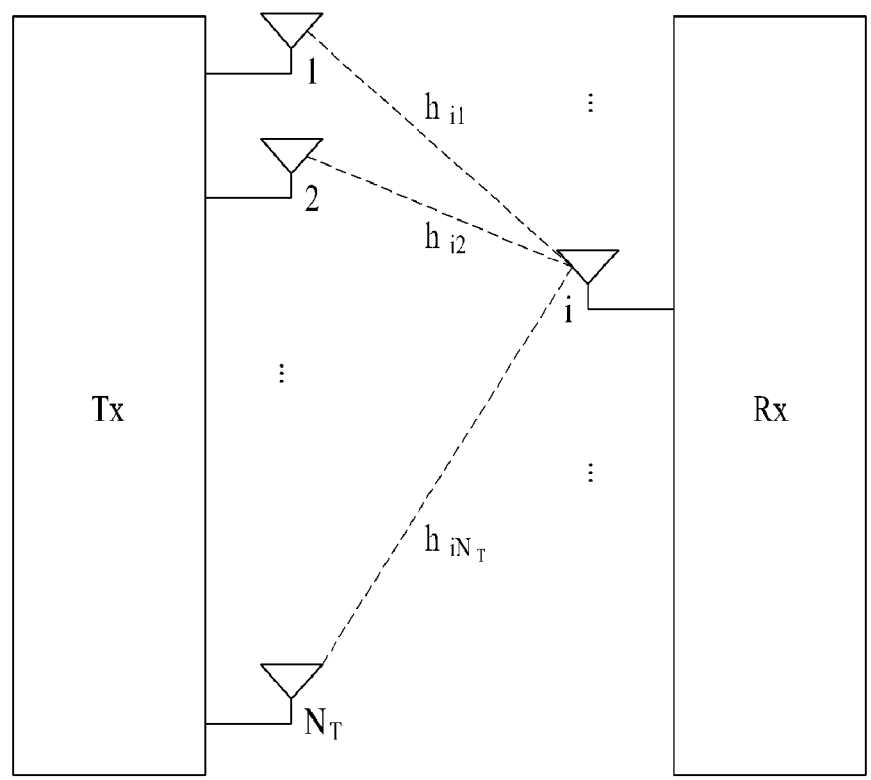
FIG. 6 illustrates channels from $N_T$ transmit antennas to i receive antennas.

FIG. 6 illustrates channels from $N_T$ transmit antennas to an $i^{th}$ receive antenna.

Referring to FIG. 6, the channels from the $N_T$ transmit antennas to the $i^{th}$ receive antenna may be expressed as [Equation 7].

$$h_i^T = [h_{i1}, h_{i2}, \ldots, h_{iN_T}] \quad \text{[Equation 7]}$$

Hence, all channels from the $N_T$ transmit antennas to the $N_R$ receive antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ receive antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \ldots & h_{1N_T} \\ h_{21} & h_{22} & \ldots & h_{2N_T} \\ \vdots & & \ddots & \vdots \\ h_{i1} & h_{i2} & \ldots & h_{iN_T} \\ \vdots & & \ddots & \vdots \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

The number of columns and rows of a channel matrix H which indicates a channel state is determined by the number of transmit and receive antennas. The number of columns in the channel matrix H equals to the number of receive antennas, $N_R$, and the number of rows equals to the number of transmit antennas, $N_T$. That is, the channel matrix H corresponds to $N_R \times N_T$.

The rank of a matrix is defined as the minimum of the numbers of independent rows or columns. Accordingly, the rank of the matrix is not larger than the number of rows or columns. The rank of the channel matrix H, rank(H) is limited as follows.

$$\text{rank}(H) \leq \min(N_T, N_R) \quad \text{[Equation 11]}$$

In a mobile communication system, a packet (or signal) is transmitted on a radio channel from a transmitter to a receiver. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. This signal is called a pilot signal or a reference signal.

In the conventional system, the transmitter transmits a packet to the receiver using one transmit antenna and one receive antenna. Most current mobile communication systems adopt multiple transmit antennas and multiple receive antennas to improve transmission/reception data efficiency. In case of data transmission and reception through multiple antennas in a mobile communication system for the purpose of improving capacity and communication performance, a reference signal exists separately for each transmit antenna. The receiver can successfully receive a signal transmitted from each transmit antenna using a known reference signal for each transmit antenna.

In a mobile communication system, RSs may be divided into an RS for channel information acquisition and an RS for data demodulation. The former needs to be transmitted over a broadband because it is for acquiring downlink channel information of a UE and to be received and measured by a UE even if the UE does not receive downlink data in a specific subframe. This RS for channel measurement can be used for measurement of handover. The latter is transmitted with a corresponding resource when an eNB sends a downlink signal. A UE receives this RS to perform channel estimation and demodulate data. This RS for demodulation needs to be transmitted in a data transmission region.

Figure 7:
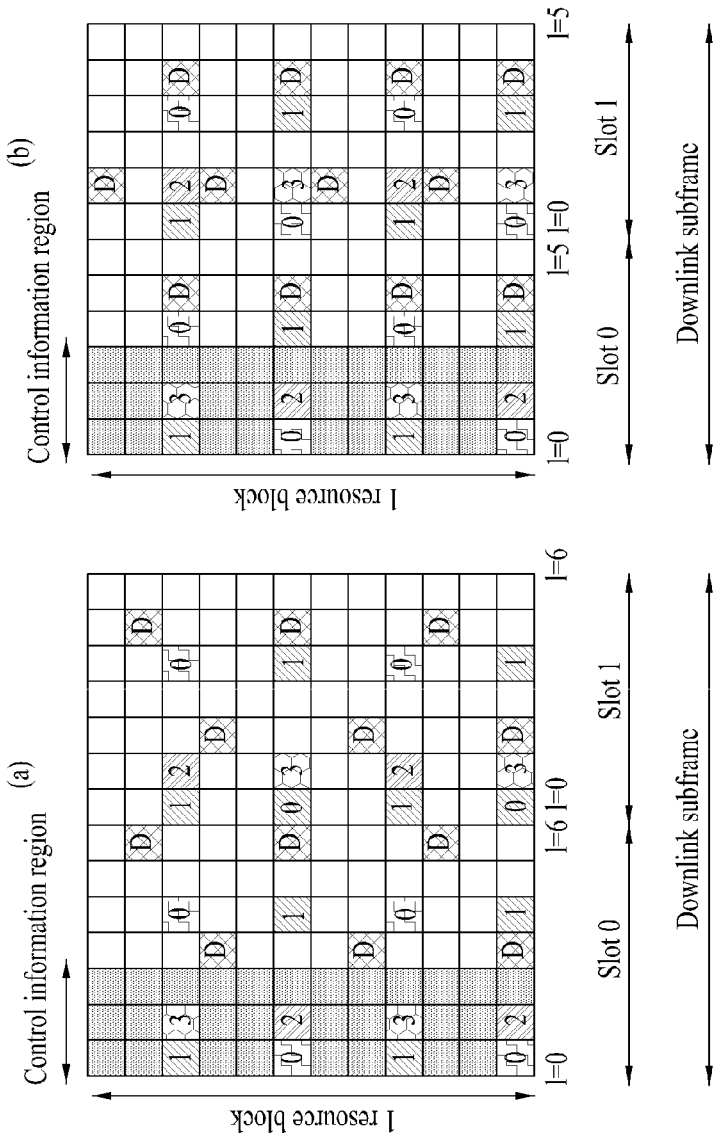
FIG. 7 illustrates reference signal patterns used in a 3GPP LTE system corresponding to a mobile communication system.

FIG. 7 illustrates reference signal patterns used in a 3GPP LTE system corresponding to a mobile communication system. FIG. 7(a) shows an RS pattern in a normal CP case and FIG. 7(b) shows an RS pattern in an extended CP case.

In a 3GPP LTE release-8 system, two types of downlink RSs are defined for unicast service. That is, there are a common reference signal (CRS) used for channel state information acquisition and handover measurement and a dedicated reference signal (DRS) (corresponding to UE-specific RS) used for data demodulation. In LTE release-8 system, the UE-specific RS is used only for data demodulation, whereas the CRS is used for channel information acquisition and data demodulation. The CRS is a cell-specific RS, and an eNB transmits a CRS for each subframe over a wideband. Cell-specific CRSs are transmitted for up to four antenna ports according to the number of transmit antennas of the eNB.

AS shown in FIGS. 7(a) and 7(b), CRSs 1, 2, 3 and 4 (respectively indicating reference signals R0, R1, R2 and R3 for four antenna ports) for four antenna ports are allocated to time-frequency resources in one RB such that the time-frequency resources do not overlap. When CRSs are mapped to time-frequency resources in an LTE system, an RS for one antenna port is mapped to one RE per six REs and transmitted in the frequency domain. Since one RB includes 12 REs in the frequency domain, two REs per RB are used for one antenna port.

As shown in FIGS. 7(a) and 7(b), a DRS (denoted by "D") is used for single-antenna port transmission of a PDSCH. A UE can receive information representing presence or absence of a UE-specific RS from a higher layer. If data demodulation is needed, the UE-specific RS is transmitted to the UE through an RE. RS mapping rules for mapping an RS to a resource block may be expressed as [Equation 12] to [Equation 14]. [Equation 12] represents a CRS mapping rule, [Equation 13] represents a DRS mapping rule to which the normal CP is applied, and [Equation 14] expresses a DRS mapping rule to which the extended CP is applied.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

-continued $$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In [Equation 12] to [Equation 14], k and p respectively denote a subcarrier index and an antenna port, and $N_{RB}^{DL}$, $n_s$ and $N_{cell}^{ID}$ respectively represent the number of RBs, the number of slot indexes and the number of cell IDs, allocated to downlink. The position of an RS depends on $V_{shift}$ in the frequency domain.

3GPP LTE-A is expected to support coordinated multi-point (CoMP) and multi-user-MIMO (MU-MIM) that are not supported by the conventional systems to improve a data transmission rate. CoMP refers to a system in which two or more eNBs or cells in cooperation with each other communicate with UEs to improve communication performance between a UE and an eNB (cell or sector) in a shaded area.

CoMP may be divided into CoMP-Joint Processing (CoMP-JP) in the form of coordinate MIMO through data sharing and CoMP-coordinated scheduling/beamforming (CoMP-CS/CB).

In case of downlink, a UE can simultaneously receive data from eNBs that perform CoMP and combine signals received from the eNBs to improve reception performance in the CoMP-JP scheme. In the CoMP-CS, the UE can instantaneously receive data from one eNB through beamforming.

In case of uplink, each eNB can simultaneously receive PUSCH signals from UEs in the CoMP-JP scheme. In the CoMP-CS scheme, only one eNB receives a PUSCH. Here, use of CoMP-CS is determined by coordinated cells (or eNBs).

In MU-MIMO, an eNB allocates antenna resources to UEs. That is, Mu-MIMO selects and schedules UEs capable of transmitting data at a high data transmission rate for each antenna. MU-MIMO improves system throughput.

Figure 8:
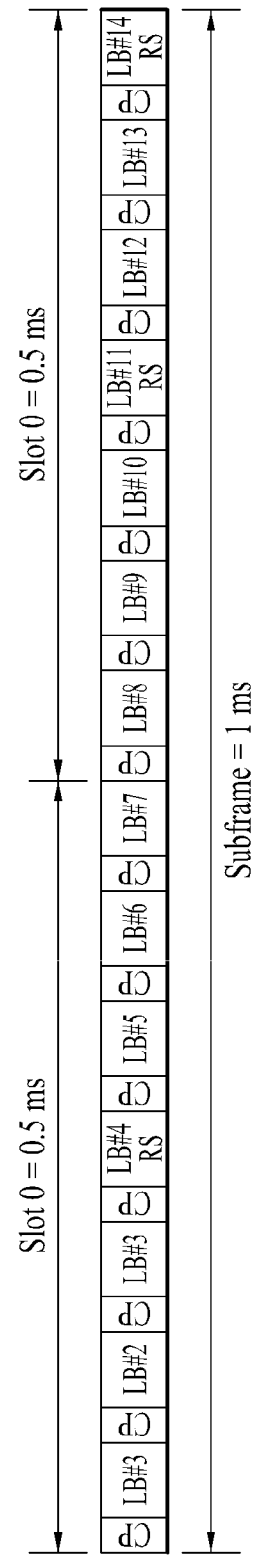
FIG. 8 shows an exemplary uplink subframe configuration including an SRS symbol.

FIG. 8 shows an exemplary uplink subframe configuration including an SRS symbol.

Referring to FIG. 8, a sounding reference signal (SRS) is used for an eNB to measure channel quality and perform uplink frequency-selective scheduling based on the channel quality measurement. The SRS is not associated with uplink data and/or control information transmission. However, the SRS may also be used for enhanced power control or for providing various functions for non-scheduled UEs. The SRS used for uplink channel measurement and as a pilot signal transmitted from a UE to an eNB is used for the eNB to estimate the state of a channel from each UE to the eNB. Channels on which the SRS is transmitted may have different transmission bandwidths and transmission intervals for UEs according to UE states. The eNB can determine a UE whose data channel is scheduled on the basis of a channel estimation result.

The SRS may be used for measuring downlink channel quality on the assumption of the reciprocity of a radio channel between the downlink and the uplink. This assumption is valid especially in a time division duplex (TDD) system in which downlink and uplink share the same frequency band and are distinguished by time. A subframe in which a UE within a cell is supposed to transmit an SRS is indicated by cell-specific broadcast signaling. A 4-bit cell-specific parameter 'srsSubframeConfiguration' indicates 15 possible sets of subframes carrying SRSs in each radio frame. This configuration may provide flexibility with which SRS overhead can be adjusted. An SRS may be transmitted in the last SC-FDMA symbol of a configured subframe.

Therefore, an SRS and a DMRS are positioned in different SC-FDMA symbols in a subframe. SRSs of UEs, transmitted in the last SC-FDMA symbols of the same subframe, may be distinguished by frequency positions thereof. PUSCH data transmission is not allowed in an SC-FDMA symbol designated for SRS transmission. Accordingly, even the highest sounding overhead (in the case where SRS symbols exist in all subframes) does not exceed 7%.

Each SRS symbol is generated using a constant amplitude zero auto correlation (CAZAC) sequence. SRSs transmitted from a plurality of UEs are CAZAC sequences, $r^{SRS}(n)=r_{u,v}^{(\alpha)}(n)$ having different cyclic shift values according to [Equation 15]. Here, $r^{SRS}(n)$ represents an SRS sequence.

$$\alpha = 2\pi \frac{n_{SRS}^{cs}}{8} \quad \text{[Equation 15]}$$

Here, $n_{SRS}^{cs}$ is a value set for each UE by a higher layer and is an integer in a range of 0 to 9. CAZAC sequences generated from one CAZAC sequence through cyclic shift have zero-correlation with sequences having cyclic shift values different those thereof. By using this characteristic, SRSs in the same frequency region can be distinguished by CAZAC sequence cyclic shift value. An SRS of each UE is allocated in the frequency domain according to a parameter set by the eNB. A UE performs frequency hopping of an SRS such that the SRS can be transmitted over the entire data transmission bandwidth.

A description will be given of relay types. In relation to the use of a bandwidth (or spectrum) of a relay, the case where a backhaul link operates in the same frequency band as an access link is referred to as in-band, and the case where the backhaul link operates in different frequency bands from the access link is referred to as out-band. In both the in-band and the out-band, UEs operating according to the existing LTE system (e.g., Release-8) should be able to access a donor cell.

The relay may be classified into a transparent relay and a non-transparent relay depending on whether or not the UE recognizes the relay. In the transparent relay, the UE is not aware that it is communicating with a network via the relay, and in the non-transparent relay, the UE is aware that it is communicating with the network via the relay.

In relation to control of the relay, the relay may be divided into a relay as part of a donor cell and a relay for controlling a cell of its own.

The relay as part of the donor cell may have a relay ID but does not have a cell ID of its own. If at least part of Radio Resource Management (RRM) is controlled by an eNB to which the donor cell belongs (while parts of the RRM may be located in the relay), this may be called a relay as part of the donor cell. Desirably, such a relay may support legacy UEs. Smart repeaters, decode-and-forward relays, different types of L2 (second layer) relays, and type-2 relays are examples of this type of relay.

In the case where a relay is in control of its own cells, the relay controls one or several cells and a unique physical-layer cell ID is provided to each of the cells controlled by the relay. The same RRM mechanism is available and in terms of the UE there is no difference in accessing cells controlled by a relay and cells controlled by a normal eNB. The cells controlled by the relay may support the legacy UEs. Self-backhauling relays, L3 (third layer) relays, type-1 relays, and type-1a relays are examples of this type of relay.

A type-1 relay is an in-band relay and controls a plurality of cells, each of which appears as a separate cell, distinct from the donor cell, to UEs. The plurality of cells has its own physical cell ID (defined in LTE Release-8) and the relay may transmit its own synchronization channels, reference signals, etc. In the context of single-cell operation, the UE may receive scheduling information and HARQ feedback directly from the relay and may transmit its own control channels (SR, CQI, ACK/NACK, etc.) to the relay. The type-1 relay appears as a legacy eNB (an eNB operating according to LTE Release-8) to legacy UEs (UEs operating according to LTE Release-8). Namely, the type-1 relay has backward compatibility. Meanwhile, to UEs operating according to an LTE-A system, the type-1 relay appears as an eNB different from the legacy eNB to allow for performance enhancement.

A type-1a relay has the same characteristics as the above-mentioned type-1 relay except that it operates in out-band. The operation of the type-1a relay may be configured to minimize an influence on the operation of an L1 (first layer) or to eliminate such influence.

A type-2 relay, which is an in-band relay, does not have a separate physical cell ID and thus does not create any new cells. The type-2 relay is transparent to the legacy UEs, and the legacy UEs are not aware of the presence of the type-2 relay. The type-2 relay may transmit a PDSCH but does not transmit a Common Reference Signal (CRS) and a PDCCH.

Meanwhile, in order to allow in-band operation of the relay, some resources in the time-frequency space should be reserved for the backhaul link and may be set not to be used for the access link. This is called resource partitioning.

A general principle for resource partitioning in the relay is as follows. The backhaul downlink and access downlink may be time division multiplexed in a single carrier frequency (namely, only one of the backhaul downlink and access downlink is activated at a specific time). Similarly, the backhaul uplink and access uplink may be time division multiplexed in a single carrier frequency (namely, only one of the backhaul uplink and access uplink is activated at a specific time).

In multiplexing the backhaul links for FDD, backhaul downlink transmission and backhaul uplink transmission are carried out in a downlink frequency band and an uplink frequency band, respectively. In multiplexing the backhaul links for TDD, backhaul downlink transmission and backhaul uplink transmission are carried out in downlink subframes of the eNB and relay and uplink subframes of the eNB and relay, respectively.

In the case of an in-band relay, for example, if reception of the backhaul downlink from the eNB and transmission of the access downlink to the UE are simultaneously performed in a predetermined frequency band, a signal transmitted from a transmitting end of the relay may be received in a receiving end of the relay and thus signal interference or Radio Frequency (RF) jamming may occur at an RF front end of the relay. Similarly, if reception of the access uplink from the UE and transmission of the backhaul uplink to the eNB are simultaneously performed in a predetermined frequency band, signal interference may occur at the RF front end of the relay. Accordingly, in the relay, simultaneous transmission and reception in a single frequency band is difficult to achieve unless sufficient separation between a transmission signal and a reception signal is provided (e.g., unless a transmission antenna and a reception antenna are sufficiently separated from each other geographically (for example, by installing them above/below ground)).

One method for solving the problem of signal interference is to allow the relay not to transmit a signal to UEs while receiving a signal from the donor cell. That is, a gap may be generated in transmission to the UEs from the relay and the UEs (including the legacy UEs) may be set not to expect any transmission from the relay during the gap. Such a gap may be set by configuring a Multicast Broadcast Single Frequency Network (MBSFN) subframe.

In the present description, a subframe corresponding to the backhaul link between the eNB and the relay is referred to as a Un subframe and a subframe corresponding to the access link between the relay and the UE is referred to as an access subframe or a Uu subframe. However, the present invention is not limited thereto.

A description will be given of a method of signaling the number of Hybrid Automatic Repeat request (HARQ) processes and a method of determining the number of HARQ processes according to embodiments of the present invention. The method of signaling the number of HARQ processes by the eNB is described first. The method of determining the number of HARQ processes and the method of signaling the number of HARQ processes can also be applied to the UE as well as the relay. That is, these methods can be applied to a HARQ process between the eNB and the UE with the introduction of an advanced PDCCH as an enhancement version of the PDCCH to the LTE-A system. A HARQ process performed between the relay and the eNB, which is introduced to the LTE-A system, is described in more detail.

The number of HARQ processes needs to be calculated on the basis of available backhaul subframes other than subframes that cannot be used as backhaul subframes (e.g. backhaul subframes that cannot configure MBSFN subframes). The number of HARQ processes may be signaled by the eNB through RRC signaling or directly calculated by the relay or the UE. Otherwise, the eNB, relay and UE may share information about the number of HARQ processes by previously defining the number of HARQ processes and a bitmap that indicates available backhaul subframes corresponding to the number of HARQ processes, as shown in Table 4.

TABLE 4

| Decimal equivalent of SubframeConfigurationFDD | Number of uplink HARQ processes |
| --- | --- |
| 1, 2, 4, 8, 16, 32, 64, 128 | 1 |
| 3, 5, 6, 9, 10, 12, 17, 18, 20, 24, 33, 34, 36, 40, 48, 65, 66, 68, 72, 80, 96, 129, 130, 132, 136, 144, 160, 192 | 2 |

TABLE 4-continued

| Decimal equivalent of SubframeConfigurationFDD | Number of uplink HARQ processes |
|---|---|
| 7, 11, 13, 14, 19, 21, 22, 25, 26, 28, 35, 37, 38, 41, 42, 44, 49, 50, 52, 56, 67, 69, 70, 73, 74, 76, 81, 82, 84, 85, 88, 97, 98, 100, 104, 112, 131, 133, 134, 137, 138, 140, 145, 146, 148, 152, 161, 162, 164, 168, 170, 176, 193, 194, 196, 200, 208, 224 | 3 |
| 15, 23, 27, 29, 30, 39, 43, 45, 46, 51, 53, 54, 57, 58, 60, 71, 75, 77, 78, 83, 86, 87, 89, 90, 91, 92, 93, 99, 101, 102, 105, 106, 107, 108, 109, 113, 114, 116, 117, 120, 135, 139, 141, 142, 147, 149, 150, 153, 154, 156, 163, 165, 166, 169, 171, 172, 173, 174, 177, 178, 180, 181, 182, 184, 186, 195, 197, 198, 201, 202, 204, 209, 210, 212, 213, 214, 216, 218, 225, 226, 228, 232, 234, 240 | 4 |
| 31, 47, 55, 59, 61, 62, 79, 94, 95, 103, 110, 111, 115, 118, 119, 121, 122, 123, 124, 125, 143, 151, 155, 157, 158, 167, 175, 179, 183, 185, 187, 188, 189, 190, 199, 203, 205, 206, 211, 215, 217, 219, 220, 221, 222, 227, 229, 230, 233, 235, 236, 237, 238, 241, 242, 244, 245, 246, 248, 250 | 5 |
| 63, 126, 127, 159, 191, 207, 223, 231, 239, 243, 247, 249, 251, 252, 253, 254, 255 | 6 |

Referring to Table 4, the number of HARQ processes in the relay is determined according to subframes configured for transmission between the eNB and the relay. For example, for FDD frame structure type 1, the number of HARQ processes can be determined by a decimal value corresponding to a binary number indicating an 8-bit bitmap of parameter 'SubframeConfigurationFDD'. The eNB and the relay may previously share Table 4. The HARQ processes may be consecutively allocated in the subframes configured for transmission between the eNB and the relay.

While backhaul subframes that cannot configure MBSFN subframes are exemplified as subframes that cannot be used as backhaul subframes, there are many types of unavailable backhaul subframes, which will be described below.

The eNB signals the number (N) of currently performed HARQ processes to the relay through higher layer signaling. The relay (relay node) can recognize a subframe in which uplink data that needs to be retransmitted by the relay has been transmitted using the number (N) of HARQ processes, received from the eNB through higher layer signaling at a specific time. According to this method, a round trip time (RTT) necessary for retransmission after initial transmission of the relay is variable and this variable RTT can be recognized using the number of actually performed HARQ processes and other information.

In the following description, it is assumed that the relay transmits uplink data in a subframe (i.e. subframe n+4) having an index of n+4 when the number of uplink backhaul subframes equals the number of downlink backhaul subframes and the eNB transmits a UL grant in a subframe (i.e. subframe n) having an index of n.

Figure 9:
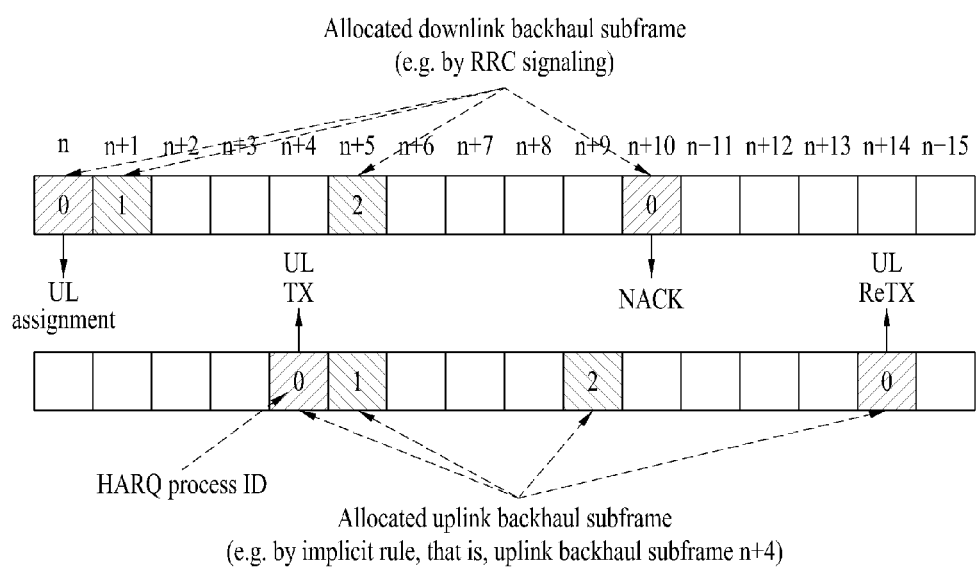
FIG. 9 shows an exemplary frame structure for explaining a HARQ process performed between a relay and an eNB.

FIG. 9 shows an exemplary frame structure for explaining a HARQ process performed between the eNB and the relay.

In FIG. 9, shaded portions represent subframes allocated as backhaul subframes. If the eNB does not successfully receive the uplink data from the relay, the relay can detect a downlink subframe in which a downlink NACK signal with respect to the uplink data is transmitted, using value N. If N=3 (if the number of HARQ processes is 3) and the NACK signal is transmitted in the third downlink subframe (in the case in which subframes are indexed in consideration of only subframes allocated to downlink backhaul resources) from a subframe n in which the UL grant is transmitted, when the eNB transmits the UL grant in the subframe n, the relay transmits the uplink data in the subframe n+4. If the eNB does not receive the uplink data, the relay needs to retransmit the uplink data that has been transmitted in uplink subframe n+4. In this case, the relay retransmits the uplink data in a subframe n+14. Here, the uplink data is the data that has failed to be initially transmitted in the subframe n+4 that comes before N (N=3 in the case of FIG. 9) subframes (on the basis of the number of subframes allocated as uplink backhaul subframes) from the subframe n+14. In the same manner, for downlink, it is assumed that, if the eNB cannot successfully receive the uplink data initially transmitted from the relay in uplink subframe n+4, a NACK signal for the uplink data is transmitted to the relay in a backhaul subframe (i.e. subframe n+10) that comes N (N=3 in the case of FIG. 9) subframes after subframe n.

When the eNB signals the number (N) of HARQ processes to the relay through higher layer signaling, the relay can detect a subframe corresponding to a process ID allocated thereto using a very simple method. If the eNB does not explicitly signal value N to the relay, the processor 175 of the relay estimates value N on the basis of a maximum number of downlink subframes present in a minimum HARQ RTT window. However, this method is complicated because it should perform window search for a plurality of subframes.

Since the number (N) of HARQ processes can be used to detect a HARQ process ID, it may be desirable that the eNB transmit the value N at the same timing as higher layer signaling (e.g. RRC signaling) used for downlink backhaul subframe allocation. Furthermore, the eNB may transmit information representing the number (N) of HARQ processes by including the same in downlink backhaul subframe allocation information. Accordingly, considering that the number of HARQ processes changes only when a downlink/uplink subframe allocation pattern varies, it may be desirable that the eNB transmit value N and downlink/uplink backhaul subframe allocation information together to the relay.

Alternatively, the eNB may not signal value N when the downlink/uplink subframe allocation pattern does not change according to event triggering, or may signal that value N does not change using an N-bit field or an additional bit. The eNB may also signal value N only when the downlink/uplink backhaul subframe allocation pattern changes, as described above. When N is transmitted only when the downlink/uplink backhaul subframe allocation pattern changes, the eNB may additionally configure signaling information of value N.

For the HARQ process described with respect to FIG. 9, uplink grant transmission timing and uplink data retransmission time can be described more clearly by introducing a virtual index in addition to the conventional subframe index to the backhaul link (Un link) between the eNB and the relay. Virtual subframe indexes (virtual indexes) are sequentially allocated only to subframes assigned to the Un link (backhaul link). The virtual subframe indexes are defined only for a UL grant and uplink/downlink paired subframes which are paired during transmission even when a downlink stand-alone subframe exists. That is, the virtual subframe index is not defined for the downlink stand-alone subframe. Accordingly, the downlink stand-alone subframe needs to be newly designated and managed in association with the HARQ process.

Table 5 and Table 6 respectively show a downlink virtual subframe index and an uplink virtual subframe index on the basis of the frame structure shown in FIG. 9. While the two virtual subframe indexes use "n'", it is differently interpreted for downlink and uplink. Table 5 shows virtual index values in downlink and Table 6 shows virtual index values in uplink.

TABLE 5

| Subframe index (n) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DL virtual index (n') | 0 (UL grant transmision) | 1 | | | | 2 | | | | | 3 | | | | | |

TABLE 6

| Subframe index (n) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| DL virtual index (n') | | | | | | 0 (UL grant transmission) | 1 | | 2 | | | | | | 0 (UL grant transmission) | |

A description will be given using the above-described virtual index n'. The eNB transmits a Un UL grant in a subframe corresponding to a downlink virtual index 0, and the relay receives the Un UL grant. The relay may transmit uplink data in a subframe corresponding to an uplink virtual index 0 in response to the Un UL grant. If retransmission occurs, the eNB can transmit an uplink retransmission grant in a subframe corresponding to a downlink virtual index 3 (when it is assumed that N=3). Uplink retransmission of the relay for the uplink grant is generated in a subframe corresponding to an uplink virtual index 3. The downlink virtual index 0 indicates a downlink subframe index 0 (i.e. n=0) and the uplink virtual index 0 indicates an uplink subframe index 4.

For uplink transmission of the relay in a subframe corresponding to the virtual index n', uplink retransmission of the relay is performed in the subframe corresponding to the virtual index n'+N where N indicates the number of Un uplink HARQ processes. More specifically, the eNB may transmit a retransmission grant for uplink transmission in a subframe corresponding to a downlink virtual index n'+N and the relay may perform uplink retransmission in a subframe corresponding to an uplink virtual index n'+N in response to transmission of the retransmission grant.

When the virtual index is defined and used for only downlink/uplink paired subframes of HARQ process, as described above, it is possible to simply specify a downlink subframe index (or uplink subframe index at which retransmission is performed) at which the retransmission index for initially transmitted data in each uplink backhaul subframe (UL Un subframe) is received. That is, the HARQ process can be easily managed and used by using the virtual index.

The virtual index n'=0 shown in Table 5 and Table 6 is exemplary, and a reference position of virtual index n'=0 may correspond to an integer multiple of a radio frame or radio subframe. Otherwise, n'=0 may be set at an interval of 40 ms (corresponding to four radio frames) in consideration of an MBSFN signaling period that designates backhaul subframes.

A scheme of considering a downlink grant stand-alone subframe for asymmetrical backhaul subframe allocation will now be described.

Figure 10:
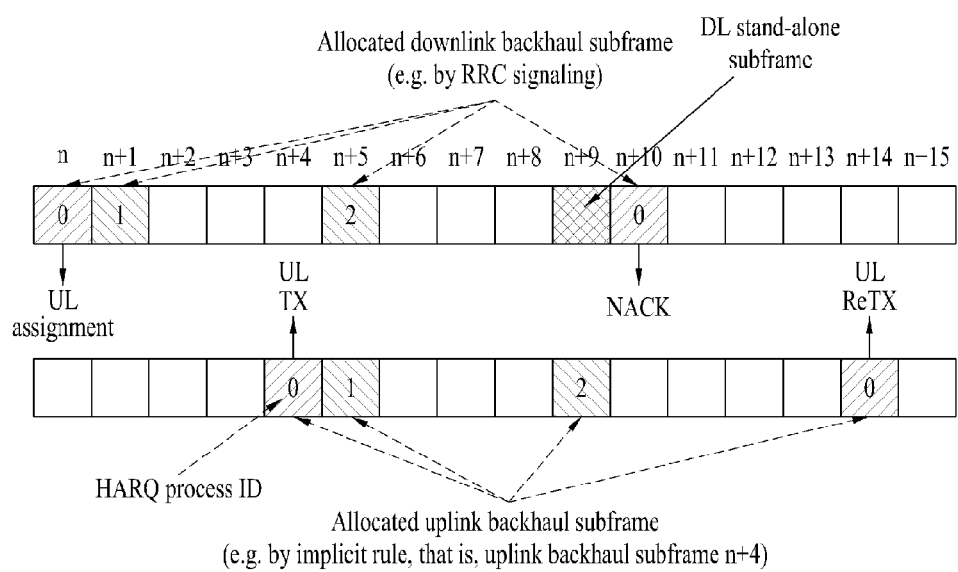
FIG. 10 shows an exemplary frame structure including a downlink grant stand-alone subframe for explaining a HARQ process performed between a relay and an eNB.

FIG. 10 shows an exemplary frame structure including a downlink grant stand-alone subframe for explaining a HARQ process performed between the relay and the eNB.

As shown in FIG. 10, the scheme illustrated in FIG. 9 is differently applied to the frame structure including a downlink stand-alone subframe. That is, the processor 175 of the relay needs to determine subframes having the same HARQ process ID except the downlink stand-alone subframe, using the number (N) of HARQ processes. That is, the downlink stand-alone subframe among allocated backhaul subframes should be excluded from indexing.

Referring to FIG. 10, a downlink subframe n+9 is not a downlink backhaul subframe corresponding to HARQ process ID 0 because it is a downlink stand-alone subframe. Information about the downlink stand-alone subframe needs to be signaled to the relay by the eNB through an appropriate method (e.g., through signaling). It may be desirable that the eNB signal the information about the downlink stand-alone subframe to the relay using higher layer signaling. Desirably, downlink stand-alone subframe allocation information is configured by the eNB as part of downlink subframe allocation signaling and transmitted to the relay at the same timing as downlink subframe allocation signaling.

Virtual subframe indexes are sequentially allocated only to subframes assigned to the backhaul link (Un link). When the downlink stand-alone subframe exists, as shown in FIG. 10, the virtual subframe indexes can be defined only for a UL grant and 'uplink/downlink paired subframes' which are paired according to uplink transmission corresponding to the UL grant. That is, the virtual subframe indexes are not defined for the downlink stand-alone subframe. However, even when the virtual subframe indexes are not defined, if the UL grant and 'uplink/downlink paired subframes' which are paired according to uplink transmission corresponding to the UL grant include a downlink stand-alone subframe, the HARQ process can be performed by excluding the downlink stand-alone subframe.

A description will be given of considerations for calculation of the number of HARQ processes in association with the aforementioned HARQ process. The following considerations are applied to calculation of the number of HARQ processes in the above-described technique.

The processor 125 of the eNB can determine the number of HARQ processes and the relay can receive information about the number of HARQ processes from the eNB. Alternatively, if the relay does not receive the information about the number of HARQ processes from the eNB through signaling, the processor 175 of the relay may estimate the number of HARQ processes.

In calculation of the number of HARQ processes, the processor 125 of the eNB needs to exclude subframes that collide with HARQ processes. For example, it is necessary to exclude non-MBSFN subframes (e.g. subframes having indexes 0, 4, 5 and 9) among backhaul subframes set in a specific pattern or a repeated form of a specific pattern from calculation of the number of HARQ processes. If K backhaul subframes among N configured backhaul subframes collide with HARQ processes, the processor 125 of the eNB can calculate the number of HARQ processes on the basis of N−K at the corresponding time. This operation and a series of steps may be performed by the processor 125 of the eNB or the processor 175 of the relay according to the above-described scheme.

For example, a backhaul subframe allocation information pattern that is repeated at an interval of 8 ms during a period of 40 ms inevitably collides (or overlap) with a non-MBSFN subframe allocation pattern that is repeated at an interval of 10 ms. In this case, it may be desirable that the processor 125 of the eNB exclude the non-MBSFN subframes corresponding to the non-MBSFN subframe allocation pattern from calculation of the number of HARQ processes. As described above, the number of HARQ processes is used for the processor 175 of the relay to determine the HARQ process ID.

The above-mentioned signaling pattern or a bitmap of the eNB may be a signaling pattern or a bitmap pattern which is indexed on the basis of subframes or radio frames of the eNB. For example, the bitmap pattern may be indexed on the basis of a subframe having an index 0 in a radio frame, which corresponds to (eNB radio frame index mod 4)=0, or indexed on the basis of a relay subframe index.

If a timing offset exists between the eNB and the relay and the bitmap pattern is started at a subframe index 0 of a specific frame of the eNB, the timing offset between the eNB and the relay should be additionally considered in order to calculate subframe indexes corresponding to non-MBSFN subframes (e.g. subframes corresponding to subframe indexes 0, 4, 5 and 9) of the relay from subframe indexes provided for the bitmap. The bitmap pattern can be interpreted in various manners from the point of view of the relay. One bitmap bit can be considered to indicate one subframe index or a plurality of subframes.

A description will be given of a method of calculating a subframe capable of being used as a backhaul frame by the processor 175 of the relay using RRC signaling information.

A time-frequency resource for transmission between the eNB and the relay is separately allocated by time-multiplexing transmission between the eNB and the relay and transmission between the relay and the UE. Subframes for transmission between the eNB and the relay are configured in a higher layer. Transmission from the eNB to the relay is performed in a downlink backhaul subframe and transmission from the relay to the eNB is performed in an uplink backhaul subframe. Subframes configured for transmission between the eNB and the relay conform a period of 8 ms. In frame structure type 1, the relay can receive an 8-bit HARQ process indication bitmap [b0 b1 ... b7] (b0 being the least significant bit (LSGB)). In the eNB cell, the downlink subframe n corresponding to a system frame number $n_f$ is considered to be configured for transmission between the eNB and the relay if it satisfies the following two conditions.

$b_k$ is set to 1 for $k=(n_f*10+n+n_{f,offset}*10+n_{offset})\mod 8$ (1)

$(n+n_{offset})\mod 10$ is 1, 2, 3, 6, 7, or 8 (2)

Here, a subframe 0 in a system frame 0 in the eNB cell is synchronized with a subframe system $n_{f,offset}$ and subframe $n_{offset}$ in every relay cell. If $b_k$ is defined in terms of the base subframe index, the downlink subframe n corresponding to the system frame number $n_f$ is considered to be configured for transmission between the eNB and the relay if it satisfies the following two conditions.

$b_k$ is set to 1 for $k=(n_f*10+n)\mod 8$ (1)

$(n+n_{offset})\mod 10$ is 1, 2, 3, 6, 7, or 8 (2)

Here, $n_{offset}$ may be a negative number or a positive number including 0.

To simplify description and implementation, all offset values between the eNB and the relay may be fixed to 0 or a specific value. This fixed offset value may be defined on a relay group-specific basis. Uplink subframe allocation corresponding to downlink subframe allocation is determined by a predefined offset value. The offset value is 4 generally but a different value can be applied as the offset value.

A description will be given of a method for calculating a backhaul subframe available for the HARQ process between the eNB and the relay.

The relay can receive an N-bit (e.g. 8-bit, 10-bit, 20-bit or 40-bit) HARQ process indication bitmap, and then use subframes other than subframes that cannot be configured by the relay as MBSFN subframes (i.e., non-MBSFM subframes having indexes of 0, 4, 5 and 9, for example) from among backhaul subframes indicated by the bitmap, as backhaul subframes (Un subframes). The bitmap pattern may be described in terms of the eNB subframe or frame index, or in terms of the relay subframe or frame index, as described above.

If the eNB configures MBSFN subframes in order to provide a multimedia broadcast multicast service (MBMS), or the processor 175 of the relay decodes an R-PDCCH using a common reference signal (CRC) because the CRC is not present in subframes configured of 3GPP LTE-A dedicated subframes and fake MBSFN subframes, the R-PDCCH cannot be decoded in the corresponding subframes. Accordingly, it may be desirable to also exclude the subframes from calculation of the number of HARQ processes because the subframes cannot be used as backhaul subframes. That is, when the eNB signals HARQ related information (e.g., 8-bit bitmap) to the relay through higher layer signaling, it is necessary to exclude subframes shown in the following table 7 from backhaul subframes indicated by the bitmap in calculation of the number of HARQ processes, as described above.

TABLE 7

Subframes to be excluded from backhaul subframes in HARQ process

1 Subframes that cannot be configured as MBSFN subframes in the relay cell (non-MBSFN)
2 Subframes configured for MBMS transmission in the eNB cell
3 3GPP LTE-A dedicated subframes or fake MBSFN subframes In this manner, HARQ process ID mapping is performed and HARQ processes are operated using subframes other than subframes that cannot be used as backhaul subframes.

However, in the case of DMRS-based R-PDCCH, it is necessary to exclude subframes shown in Table 8 from calculation of the number of HARQ processes.

TABLE 8

Subframes to be excluded from backhaul subframes in HARQ process

1 Subframes that cannot be configured as MBSFN subframes in the relay cell (non-MBSFN)
2 Subframes configured for MBMS transmission in the eNB cell Referring to FIG. 8, the 3GPP LTE-A dedicated subframes or fake MBSFN subframes can be used as backhaul subframes because the 3GPP LTE-A dedicated subframes or fake MBSFN subframes can transmit the DMRS-based R-PDCCH although the DMRS as well as the CRC do not exist when the eNB performs MBMS transmission.

The above description can be applied even when the relay has a subframe offset different from that of the eNB in subframe timing. However, if the eNB and the relay have different subframe offsets, the eNB should configure MBSFN subframes and perform macro UE scheduling in consideration of the different subframe offsets, and thus the degree of freedom of scheduling may be restricted. Accordingly, it may be desirable to set the subframe offset to 0.

As described above, the eNB may transmit backhaul subframe allocation information to the relay for Un downlink transmission to the relay. The relay may use, as backhaul subframes (Un subframes), subframes other than relay Un downlink non-MBSFN subframes (i.e., subframes that cannot be used as MBSFN subframes having indexes of 0, 4, 5 and 9, for example) from among received signaling information (e.g., 8-bit bitmap). When the eNB provides true MBSFN service or transmits a positioning RS (PRS), the above subframes cannot be used as backhaul subframes.

Figure 11:
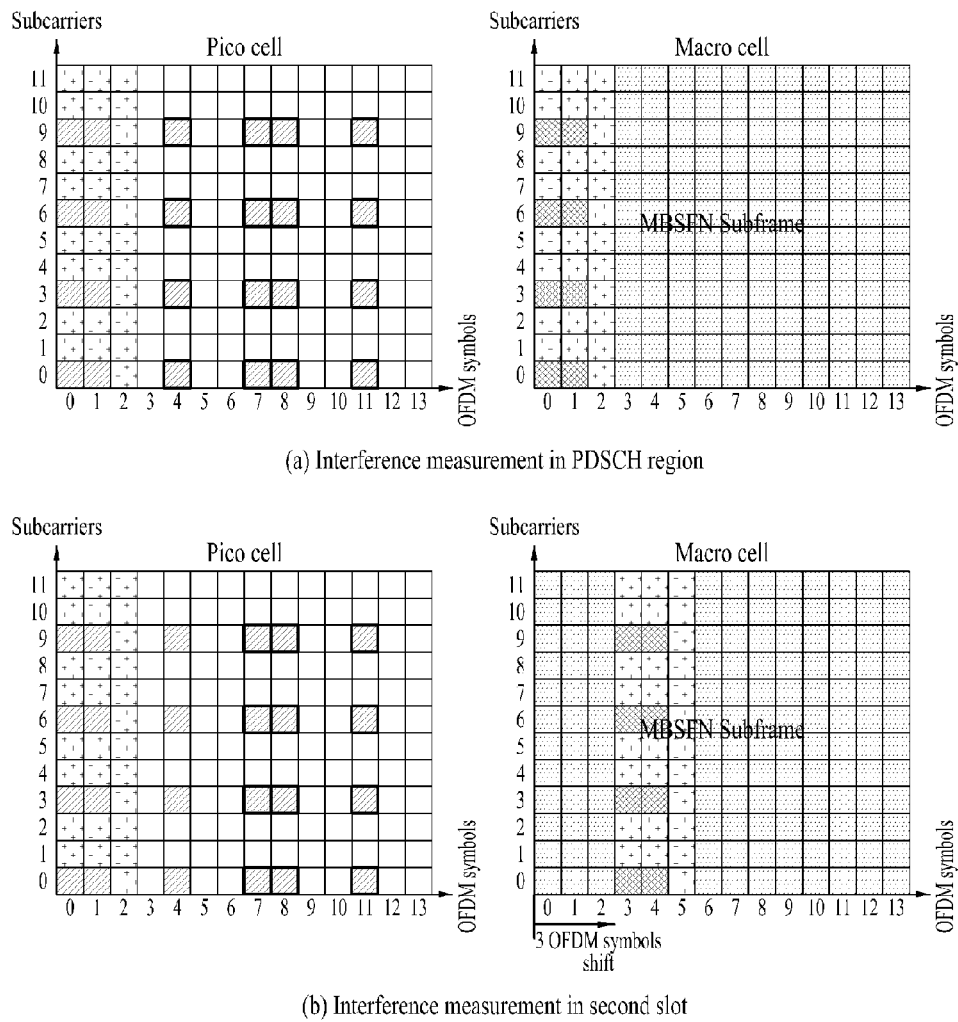
FIG. 11 illustrates MBSFN configurations for interference coordination, FIG. 11a showing interference measurement in a PDSCH region, FIG. 11b showing interference measurement in a second slot.

FIG. 11 illustrates MBSFN configurations for interference coordination. FIG. 11a shows interference measurement in a PDSCH region and FIG. 11b shows interference measurement in a second slot.

If the eNB attempts to perform coordination such as interference coordination with other cell, the eNB needs to signal the following additional information to the relay. For example, a macro eNB (or cell) can configure MBSFN subframes, as shown in FIGS. 11(a) and 11(b), to reduce interference in a measurement RE of a pico cell such that the pico cell can perform reduced-interference data transmission. A similar operation can be performed using an almost blank subframe (ABS). A CRS signaled by a network for measurement is received through the PDSCH region of the pico cell in the case of FIG. 11(a), whereas the CRS is received through the second slot in the case of FIG. 11(b).

While interference coordination information using MBSFN or ABS is not considered because the nature of the interference coordination information is different from the backhaul subframe allocation information, the eNB can efficiently combine the interference coordination information and the backhaul subframe allocation information and transmit the combined information to the relay as inter-cell interference coordination (ICIC) becomes applicable to the relay. The processor 175 of the relay needs to determine how to operate by receiving the information even if the information is not the combined information (signal).

There is a method of configuring Un subframe allocation bitmap information using subframe information that cannot be allocated to Un subframes. It may be possible to configure a signal by adding subframes, which cannot be used as Un subframes because they are MBSFN subframes or ABSs, to the Un subframe allocation bitmap information. That is, the relay can recognize Un subframe allocation information from combined signaling information. In addition, since CRS transmission is not performed in the case of LTE-A dedicated subframes, a CRS-based relay cannot use the LTE-A dedicated subframes as Un subframes. Accordingly, the CRS-based relay needs to exclude the LTE-A subframes from Un subframes and perform HARQ process. The eNB can signal the LTE-A dedicated subframes to the relay through separate signaling, as shown in Table 9.

TABLE 9

Examples of signaling types for signaling LTE-A dedicated subframe information

1  Un subframe allocation signaling
2  Coordination signaling (e.g. MBSFN or ABS for enhanced inter-cell interference coordination (eICIC) or measurement)
3  LTE-A dedicated subframe(including no CRS)
4  True MBSFN subframe (MCH)
5  Positioning RS subframe (including no data transmission)
6  Combination of signaling information 1 to 5.

The signaling information shown in Table 9 may be signaled in different forms by being combined. Particularly, combination of signaling information 1 and 2 can reduce signaling overhead. If the signaling information 1 and 2 is configured in the form of a bitmap, a compact signal can be configured by obtaining the union or intersection of the two bitmaps or by masking the two bitmaps. Signaling information 3 may be combined with the signaling information 1 and 2. The signaling information 3 can be signal by the eNB to a CRS-based relay. A relay needs to differently interpret signaling according to whether the relay is based on CRS or DMRS.

When the Un subframe allocation bitmap is 8 bits and an interference subframe bitmap is 40 bits, the processor 175 of the relay can configure 40 bits by a concatenation of 8-bit units, consider subframes other than non-MBSFN subframes, true MBSFN subframes and interference coordination subframes as allocated Un subframes, and perform HARQ operation in the Un subframes. A relay that decodes an R-PDCCH based on the CRS needs to perform a HARQ process by excluding a subframe including no CRS from backhaul subframes. While a subframe that cannot be used as a Un subframe is generally excluded from HARQ process mapping, it may be considered to suspend HARQ operation in the corresponding subframe without excluding the subframe from HARQ process mapping if the subframe is not frequently generated. This method determines Un subframes according to frequency of generation of subframes rather than signaling type. Accordingly, different Un subframe determination methods can be implemented for relays.

Table 10 shows backhaul subframe information and unavailable subframe information.

TABLE 10

| subframe index (SF index) | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|---|---|---|---|---|---|---|---|---|
| Fake MBSFN (Relay) | X | | | X | X | | X | | | | | X | X | | | X | X | | | | X | X | | | X | X | | X | X | | | | | | | | | | | X |
| 8 ms Bitmap (1: Un SF) | 0 | 1 | 1 | 1 | 0 | 0 | 1 | 1 | 0 | 1 | 1 | 1 | 0 | 0 | 1 | 1 | 0 | 1 | 1 | 1 | 0 | 0 | 1 | 1 | 0 | 1 | 1 | 1 | 0 | 0 | 1 | 1 | 0 | 1 | 1 | 1 | 0 | 0 | 1 | 1 |
| 40 ms bitmap (eICIC) | | | | 1 | | | | | | | | | | 1 | | | | | | | | | 1 | | | | | | | | | 1 | | | | | 1 | | | |
| True MBSFN (eNB) | | | | | 1 | | | | | | | | | | | | | | | | | | | | | | | | | | | | | | | | | | | |
| LTE-A (eNB) | 1 | | | | | | | 1 | | | | | | | | 1 | | | | | | | | | 1 | | | | | | | | | 1 | | | | | | |
| Available Un-SF (1: Un SF) | | 1 | | | | 1 | 1 | | 1 | | | | | | 1 | | | | | | | | | | | 1 | 1 | | | | | | | | 1 | 1 | | | | 1 |

Referring to FIG. 10, the eNB can signal Fake MBSFN subframe allocation information (corresponding to subframe indexes represented by X) to the relay. In addition, the eNB can signal backhaul subframe (Un subframe) allocation information in the form of an 8-bit bitmap (corresponding to subframes signaled by '1' to the relay). Furthermore, the eNB can transmit interference coordination subframe allocation information in a 40-bit bitmap pattern (corresponding to subframes signaled by '1') to the relay. And, the eNB can transmit true MBSFN subframe allocation information and LTE-A dedicated subframe allocation information (corresponding to subframes signaled by '1') to the relay. Accordingly, the processor 175 of the relay can recognize, as available backhaul subframes, subframes other than the fake MBSFN subframes, interference coordination subframes, true MBSFN subframes and LTE-A dedicated subframes from among the subframes allocated as backhaul subframes (Un subframes). Otherwise, the eNB can directly signal available backhaul subframes to the relay such that the relay can be aware of the available backhaul subframe information.

Table 11 shows the information shown in Table 100 as a unified signal.

unified bitmap and transmit the unified bitmap. An agreement should be made between the eNB and the relay in advance such that the relay can interpret the unified bitmap. The unified bitmap can be unified as a signal other than a coordination signal.

The eNB can transmit available backhaul subframe allocation information in the unified signaling pattern shown in Table 11 to the relay such that the relay can perform a HARQ process. In the unified signaling pattern shown in Table 11, subframes represented by '0' correspond to backhaul subframes in which the relay performs the HARQ process. The eNB may transmit the unified signaling pattern, subframes allocated as backhaul subframes (Un subframes), interference coordination subframes, true MBSFN subframes and LTE-A dedicated subframes together through independent signaling processes. In this case, the relay may use the subframes to verify whether the subframes are available Un subframes.

When the relay receives the backhaul subframes (Un subframes), interference coordination subframes, true MBSFN subframes, and LTE-A dedicated subframes from the eNB through independent signaling processes or a unified signal-

TABLE 11

| Subframe index (SF index) | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|---|---|---|---|---|---|---|---|---|---|---|---|---|---|---|---|---|---|
| 8 ms Bitmap (0: Un SF) | 1 | 0 | 0 | 0 | 1 | 1 | 0 | 0 | 1 | 0 | 0 | 0 | 1 | 1 | 0 | 0 | 1 | 0 | 0 | 0 | 1 | 1 | 0 | 0 | 1 | 0 | 0 | 0 | 1 | 1 | 0 | 0 | 1 | 0 | 0 | 0 | 1 | 1 | 0 | 0 |
| 40 ms bitmap (eICIC) |  | 1 |  |  |  |  |  | 1 |  |  |  |  |  | 1 |  |  |  |  |  |  |  |  |  | 1 |  |  |  |  |  | 1 |  |  |  |  |  |  |  |  |  |  |
| True MBSFN (eNB) |  |  | 1 |  |  |  |  |  |  |  |  |  |  |  |  |  |  |  |  |  |  |  |  |  |  |  |  |  |  |  |  |  |  |  |  |  |  |  |  |  |
| LTE-A (eNB) | 1 |  |  |  |  |  | 1 |  |  |  |  |  |  |  |  | 1 |  |  |  |  |  |  |  |  |  | 1 |  |  |  |  |  |  |  |  |  | 1 |  |  |  |  |
| Colum-wise sum of each bit | 2 | 0 | 1 | 1 | 1 | 1 | 0 | 0 | 2 | 0 | 1 | 0 | 1 | 1 | 0 | 0 | 2 | 0 | 1 | 0 | 1 | 1 | 0 | 0 | 2 | 0 | 1 | 0 | 1 | 1 | 0 | 0 | 2 | 0 | 1 | 0 | 1 | 1 | 0 | 0 |
| Unified signaling pattern (0: Un SF) |  | 0 |  |  |  | 0 | 0 | 0 |  | 0 |  | 0 | 0 |  | 0 | 0 |  | 0 | 0 | 0 |  |  | 0 | 0 |  | 0 | 0 | 0 |  |  | 0 | 0 |  | 0 | 0 | 0 |  |  | 0 | 0 |

Relay can receive unified signaling pattern and configure backhaul (Un) HARQ operation based on subframes other than the next fake MBSFN subframe.

| Fake MBSFN (RN) | X |  |  |  | X | X |  |  |  | X |  |  |  |  | X | X |  |  |  | X | X |  |  |  |  | X | X |  |  |  | X | X |  |  |  |  | X | X |  | X |
| Available backhaul subframe (Un SF) (0: Un SF) |  | 0 |  |  |  |  |  | 0 | 0 |  | 0 |  |  |  |  |  |  | 0 | 0 |  |  |  |  | 0 | 0 |  |  |  |  |  |  |  | 0 | 0 |  |  |  |  | 0 |  |

Referring to FIG. 11, it is assumed that the eNB transmits the Un subframe allocation information in the form of an 8-bit bitmap to the relay and transmits a 40-bit interference coordination information bitmap to the relay. This assumption is applicable to a bitmap of other signaling information, which has a different pattern length.

The eNB normally transmits the 8-bit bitmap pattern. In this case, the eNB may determine a final signal, that is, a 40-bit bitmap pattern, by considering the 40-bit interference coordination information bitmap (including interference coordination subframe information) and a 40-bit bitmap pattern corresponding to five repeated 8-bit Un subframe bitmaps, together. Accordingly, it is possible to determine Un subframes using only the interference coordination information bitmap pattern without the Un subframe bitmap pattern.

It is also possible to reflect all signaling information shown in Table 10 in the coordination bitmap pattern to obtain a ing process, the processor 175 of the relay can determine subframes, which are left after excluding fake MBSFN subframes from the received subframes, as available backhaul subframes. The processor 175 of the relay can perform backhaul HARQ process using the determined available backhaul subframes. The processor 175 of the relay can determine the backhaul subframes by combining independent signaling information or on the basis of the received unified signaling information. The backhaul subframes may correspond to subframes represented by '0' in the unified signaling pattern shown in FIG. 11.

While the HARQ process and signaling method focus on the eNB and the relay, the relay is an exemplary entity of a wireless communication and the HARQ process and signaling method can be applied to other entities.

The signaling processes and operations related to Table 10 and Table 11 are not defined only for one-direction communication from the eNB to the relay, and they can be applied to bi-direction communication between two cells if the cells are considered to be equal.

Figure 12:
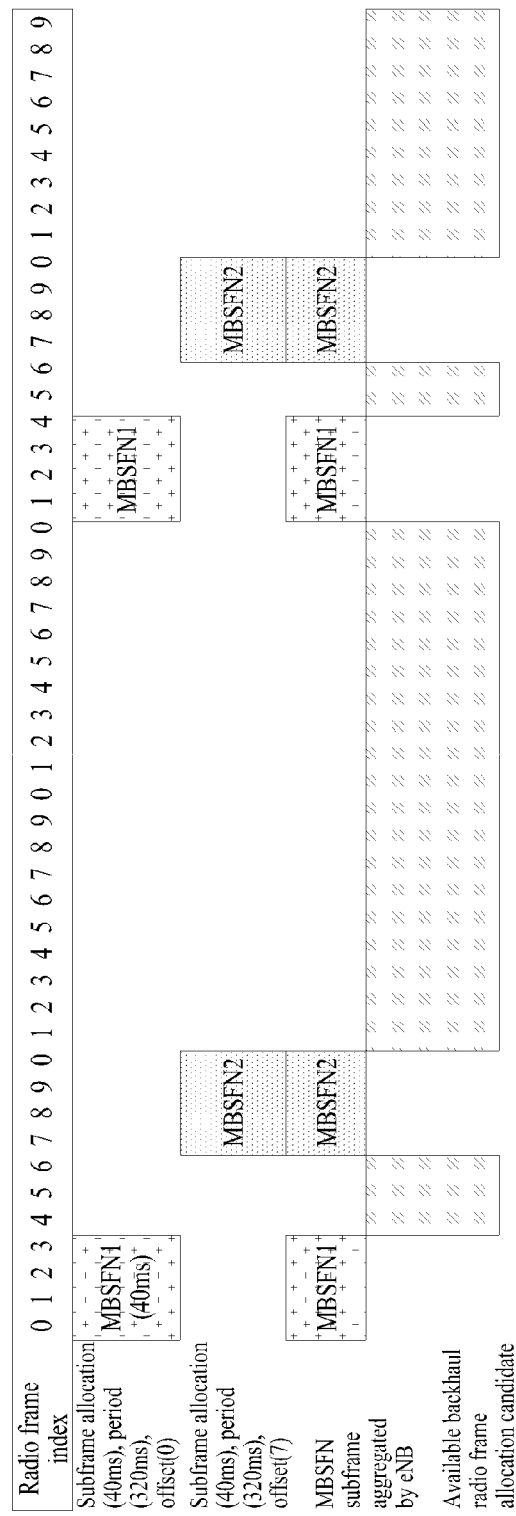
FIGS. 12 and 13 illustrate exemplary MBSFN subframe configurations.

Table 12 shows system information block (SIB) type 2 of the 3GPP LTE system.

covers eight MBSFN areas as shown in FIG. 12, the number of subframes set to MBSFN subframes increases. In this case, an input value range needs to be set when [Equation 16] is applied to determine the number of HARQ processes and HARQ process ID.

TABLE 12

| SystemInformationBlockType2 information element |
| --- |
| -- ASN1START |
| SystemInformationBlockType2 ::=    SEQUENCE { |
|     ac-BarringInfo                      SEQUENCE { |
|         ac-BarringForEmergency              BOOLEAN, |
|         ac-BarringForMO-Signalling          AC-BarringConfig         OPTIONAL,   -- Need OP |
|         ac-BarringForMO-Data                AC-BarringConfig         OPTIONAL    -- Need OP |
|     }                                                                OPTIONAL,   -- Need OP |
|     radioResourceConfigCommon          RadioResourceConfigCommonSIB, |
|     ue-TimersAndConstants              UE-TimersAndConstants, |
|     freqInfo                           SEQUENCE { |
|         ul-CarrierFreq                      ARFCN-ValueEUTRA         OPTIONAL,   -- Need OP |
|         ul-Bandwidth                        ENUMERATED {n6, n15, n25, n50, n75, n100} |
|                                                                      OPTIONAL,   -- Need OP |
|         additionalSpectrumEmission          AdditionalSpectrumEmission |
|     }, |
|     mbsfn-SubframeConfigList           MBSFN-SubframeConfigList  OPTIONAL,   -- Need OR |
|     timeAlignmentTimerCommon           TimeAlignmentTimer, |
|     ... |
| } |
| AC-BarringConfig ::=                 SEQUENCE { |
|     ac-BarringFactor                     ENUMERATED { |
|                                              p00, p05, p10, p15, p20, p25, p30, p40, |
|                                              p50, p60, p70, p75, p80, p85, p90, p95}, |
|     ac-BarringTime                       ENUMERATED {s4, s8, s16, s32, s64, s128, s256, s512}, |
|     ac-BarringForSpecialAC               BIT STRING (SIZE(5)) |
| } |
| MBSFN-SubframeConfigList ::=         SEQUENCE (SIZE (1..maxMBSFN-Allocations)) OF |
| MBSFN-SubframeConfig |
| MBSFN-SubframeConfig ::=             SEQUENCE { |
|     radioframeAllocationPeriod           ENUMERATED {n1, n2, n4, n8, n16, n32}, |
|     radioframeAllocationOffset           INTEGER (0..7), |
|     subframeAllocation                   CHOICE { |
|         oneFrame                             BIT STRING (SIZE(6)), |
|         fourFrames                           BIT STRING (SIZE(24)) |
|     } |
| } |
| -- ASN1STOP |

Referring to FIG. 12, SIB type 2 information may include MBSFN subframe configuration list information. According to the MBSFN subframe configuration list information, a subframe pattern can be determined by radioframeAllocationPeriod, radioframeAllocationOffset, subframeAllocation (oneFrame, fourFrames). As many subframe patterns as the number of maxMBSFN-Allocations can be designated.

Figure 13:
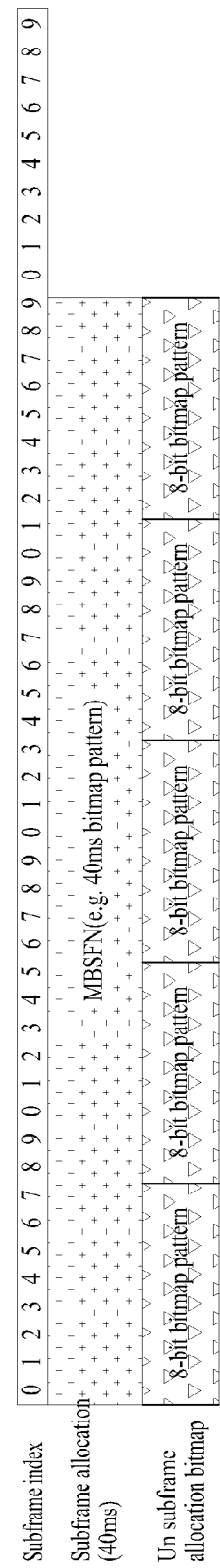

FIGS. 12 and 13 illustrate exemplary MBSFN subframe configurations.

These configurations are equally used to configure fake-MBSFN. Accordingly, it may be desirable to exclude subframes to be used as true MBSFN subframes and fake-MBSFN subframes from a bitmap pattern used for backhaul subframe allocation. Since the backhaul subframe pattern, which corresponds to repeated N-bit bitmap patterns, and the MBSFN bitmap pattern having a period different from that of the backhaul subframe pattern are unrelated independent patterns, an available backhaul subframe bitmap exhibits a very irregular pattern when the MBSFN bitmap pattern is excluded from the backhaul subframe bitmap. Particularly, if the eNB $$N_{HARQ} = \max_{i=0...N} \sum_{j=i}^{i+8} \begin{cases} 1 & Un \text{ subframe} \\ 0 & Uu \text{ subframe} \end{cases}$$ [Equation 16]

Where, N denotes an RRC-signaled 10 ms or 40 ms Un subframe configuration period.

The number of HARQ processes and a minimum WIT depend on an input value. As a method of setting the input value range, a subframe section (window) in which a maximum number of available backhaul subframes can be obtained, from a result obtained by masking out the MBSFN subframe bitmap pattern from the Un subframe bitmap pattern, is used as an input parameter. This can minimize the HARQ minimum RTT in backhaul subframes. Alternatively, a subframe section (window) in which a minimum number of available backhaul subframes can be obtained, from the result obtained by masking out the MBSFN subframe bitmap pattern from the Un subframe bitmap pattern, is used as an input parameter. This can solve a problem caused by suspending with respect to MBSFN subframes while increasing the HARQ minimum RTT in the backhaul subframes. Alternatively, K (a formula input parameter size) subframes from a specific position (obtained by calculation or predetermined) in MBSFN subframes can be selected and used. In this case, a value (e.g., average) that does not exceed a specific critical point in consideration of the predetermined number of times of suspending and other system parameters can be used as an input parameter.

In the aforementioned method for determining available effective backhaul subframes, the effective backhaul subframes are determined by additionally taking the following into account. Two types of bitmap patterns exist as a signal transmitted/received for eICIC according to usage and characteristics thereof, and each bitmap pattern may indicate a specific subframe. Especially, each bitmap pattern can be used to designate an ABS pattern. For example, the bitmap patterns have a period of 40 ms in the case of FDD and 20 ms (configurations 1 to 5), e.g., 70 ms (configuration 0) and 60 ms (configuration 6) in the case of TDD. It is assumed that the bitmap patterns are semi-statically updated and the frequency of update of the bitmap patterns is lower than the frequency of update of 3GPP LTE Release 8/9 RNTP signal.

If the two types of bitmap patterns are respectively referred to as bitmap 1 and bitmap 2, they can be defined as follows. Bitmap 1 may indicate subframes corresponding to ABSs and bitmap 2 may indicate a sub-set of the subframes indicated by bitmap 1. Bitmap 2 is recommended in a reception mode for configuration of limited radio link monitoring (RLM)/RRM measurement. A serving cell can indicate actual resources for RLM/RRM and CSI through RRC signaling. Bitmap 2 can be triggered non-periodically or on an event basis.

Since ABSs designated by the bitmap patterns cannot be used as backhaul subframes, it may be desirable to exclude the ABSs from available effective backhaul subframes. A bitmap to be excluded may be determined as follows since the bitmaps 1 and 2 have different usages. Subframes indicated by bitmap 1 may be excluded from the effective backhaul subframes. Otherwise, subframes indicated by bitmap 2 may be excluded from the effective backhaul subframes. Alternatively, subframes indicated by a pattern corresponding to the union of bitmap 1 and bitmap 2 (e.g., subframes indicated by bitmap 1) may be excluded from the effective backhaul subframes.

The eNB and the relay can perform efficient HARQ process through the backhaul link according to the above-mentioned method for determining the number of HARQ processes and the method for signaling the number of HARQ processes. The method for determining the number of HARQ processes and the method for signaling the number of HARQ processes can be applied to a link between the eNB and the UE and a link between the relay and the UE as well as the link between the eNB and the relay.

The embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The method for performing a HARQ process and the apparatus using the same are applicable to a variety of communication systems including 3GPP LTE, LTE-A systems, etc.

The invention claimed is:

1. A method of performing a hybrid automatic repeat request (HARQ) process operation using a frequency division duplex (FDD) frame structure by a base station (BS) in a wireless communication system, the method comprising:
transmitting information regarding a number of HARQ processes between the BS and a relay node (RN) to the RN,
wherein the number of the HARQ processes depends on at least one subframe configured for transmission between the BS and the RN,
wherein each of the HARQ processes is assigned to at least one subframe configured for RN-to-BS transmission according to the number of the HARQ processes, and
wherein the at least one subframe to which each of the HARQ processes is assigned must be a multicast broadcast single frequency network (MBSFN) subframe.

2. The method of claim 1, wherein the information is transmitted as a type of 8-bit bitmap.

3. The method of claim 2, wherein the number of the HARQ processes is determined by decimal equivalent of the binary number representing the 8-bit bitmap.

4. The method of claim 2, wherein the number of the HARQ processes corresponds to a number of bit represented by "1" among at least one binary number representing the 8-bit bitmap.

5. The method of claim 1, wherein the information is transmitted through a higher layer signaling.

6. The method of claim 1, wherein the information is transmitted through a higher layer signaling.

7. The method of claim 1, wherein the at least one subframe to which each of the HARQ processes is assigned corresponds to subframe indexes 0, 4, 5, or 9.

8. A method of performing a hybrid automatic repeat request (HARQ) process operation using a frequency division duplex (FDD) frame structure at a relay node (RN) in a wireless communication system, the method comprising:
receiving information regarding a number of HARQ processes between a base station (BS) and the RN from the BS,
wherein the number of the HARQ processes depends on at least one subframe configured for transmission between the BS and the RN,
wherein each of the HARQ processes is assigned to at least one subframe configured for RN-to-BS transmission according to the number of the HARQ processes, and
wherein the at least one subframe to which each of the HARQ processes is assigned must be a multicast broadcast single frequency network (MBSFN) subframe.

9. The method of claim 8, wherein the information is received as a type of 8-bit bitmap.

10. The method of claim 9, wherein the number of the HARQ processes is determined by decimal equivalent of the binary number representing the 8-bit bitmap.

11. The method of claim 9, wherein the number of the HARQ processes corresponds to a number of bit represented by "1" among at least one binary number representing the 8-bit bitmap.

12. The method of claim 8, wherein the information is received through a higher layer signaling.

13. The method of claim 8, wherein the at least one subframe to which each of the HARQ processes is assigned corresponds to subframe indexes 0, 4, 5, or 9.

14. A base station (BS) of performing a hybrid automatic repeat request (HARQ) process operation using a frequency division duplex (FDD) frame structure in a wireless communication system, the BS comprising:
- a transmitter configured to transmit information regarding a number of HARQ processes between the BS and a relay node (RN) to the RN,
- wherein the number of the HARQ processes depends on at least one subframe configured for transmission between the BS and the RN,
- wherein each of the HARQ processes is assigned to at least one subframe configured for RN-to-BS transmission according to the number of the HARQ processes, and
- wherein the at least one subframe to which each of the HARQ processes is assigned must be a multicast broadcast single frequency network (MBSFN) subframe.

15. The BS of claim 14, wherein the information is transmitted as a type of 8-bit bitmap.

16. The BS of claim 14, wherein the number of the HARQ processes is determined by decimal equivalent of the binary number representing the 8-bit bitmap.

17. The BS of claim 16, wherein the number of the HARQ processes corresponds to a number of bits represented by "1" among at least one binary number representing the 8-bit bitmap.

18. The BS of claim 14, wherein the at least one subframe to which each of the HARQ processes is assigned corresponds to subframe indexes 0, 4, 5, or 9.

19. A relay node (RN) of performing a hybrid automatic repeat request (HARQ) process operation using a frequency division duplex (FDD) frame structure at a relay node (RN) in a wireless communication system, the RN comprising:
- a receiver configured to receive information regarding a number of HARQ processes between a base station (BS) and the RN from the BS;
- a processor configured to acquire the number of the HARQ processes,
- wherein the number of the HARQ processes depends on at least one subframe configured for transmission between the BS and the RN,
- wherein each of the HARQ processes is assigned to at least one subframe configured for RN-to-BS transmission according to the number of the HARQ processes, and
- wherein the at least one subframe to which each of the HARQ processes is assigned must be a multicast broadcast single frequency network (MBSFN) subframe.

20. The RN of claim 19, wherein the at least one subframe to which each of the HARQ processes is assigned corresponds to subframe indexes 0, 4, 5, or 9.

* * * * *